US012720578B2

(12) United States Patent
Hassan et al.

(10) Patent No.: US 12,720,578 B2
(45) Date of Patent: Aug. 25, 2026

(54) METHOD AND APPARATUS FOR RECEIVING INFORMATION

(71) Applicant: Robert Bosch GmbH, Stuttgart (DE)

(72) Inventors: Khaled Shawky Hassan, Sarstedt (DE); Soheil Gherekhloo, Lauffen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 475 days.

(21) Appl. No.: 18/188,910

(22) Filed: Mar. 23, 2023

(65) Prior Publication Data

US 2023/0319858 A1 Oct. 5, 2023

(30) Foreign Application Priority Data

Mar. 31, 2022 (EP) .................................... 22165996

(51) Int. Cl.
*H04W 72/40* (2023.01)
*H04W 72/121* (2023.01)

(52) U.S. Cl.
CPC ......... *H04W 72/40* (2023.01); *H04W 72/121* (2013.01)

(58) Field of Classification Search
CPC ... H04W 72/40; H04W 72/121; H04W 72/25; H04W 72/23; H04W 4/40; H04W 88/04; H04W 72/0446; H04W 72/0453; H04W 72/0457
See application file for complete search history.

(56) References Cited

U.S. PATENT DOCUMENTS

2016/0095092 A1* 3/2016 Khoryaev ............ H04W 8/005 370/329
2017/0041941 A1* 2/2017 Chen ...................... H04L 43/16
2020/0344708 A1* 10/2020 Liao ..................... H04W 72/02
2021/0204268 A1 7/2021 Hassan Hussein et al.
2021/0219268 A1 7/2021 Li et al.
2021/0337515 A1* 10/2021 Wang ................. H04W 72/121
2022/0116917 A1* 4/2022 Zhao .................. H04W 72/044
2022/0225297 A1* 7/2022 Wang ................... H04W 72/21
2023/0138096 A1* 5/2023 Zhao .................... H04W 72/40 370/329
2024/0406983 A1* 12/2024 Kusashima .......... H04W 24/08

* cited by examiner

*Primary Examiner* — Ricky Q Ngo
*Assistant Examiner* — Kabir U Jahangir
(74) *Attorney, Agent, or Firm* — Norton Rose Fulbright US LLP

(57) ABSTRACT

A computer-implemented method. The method includes: receiving, by a first terminal device, first information characterizing a resource configuration provided by a network device for a data exchange between a) the network device and at least one terminal device and/or b) at least two terminal devices, providing second information based on the first information via at least one sidelink transmission to at least one further terminal device.

27 Claims, 17 Drawing Sheets

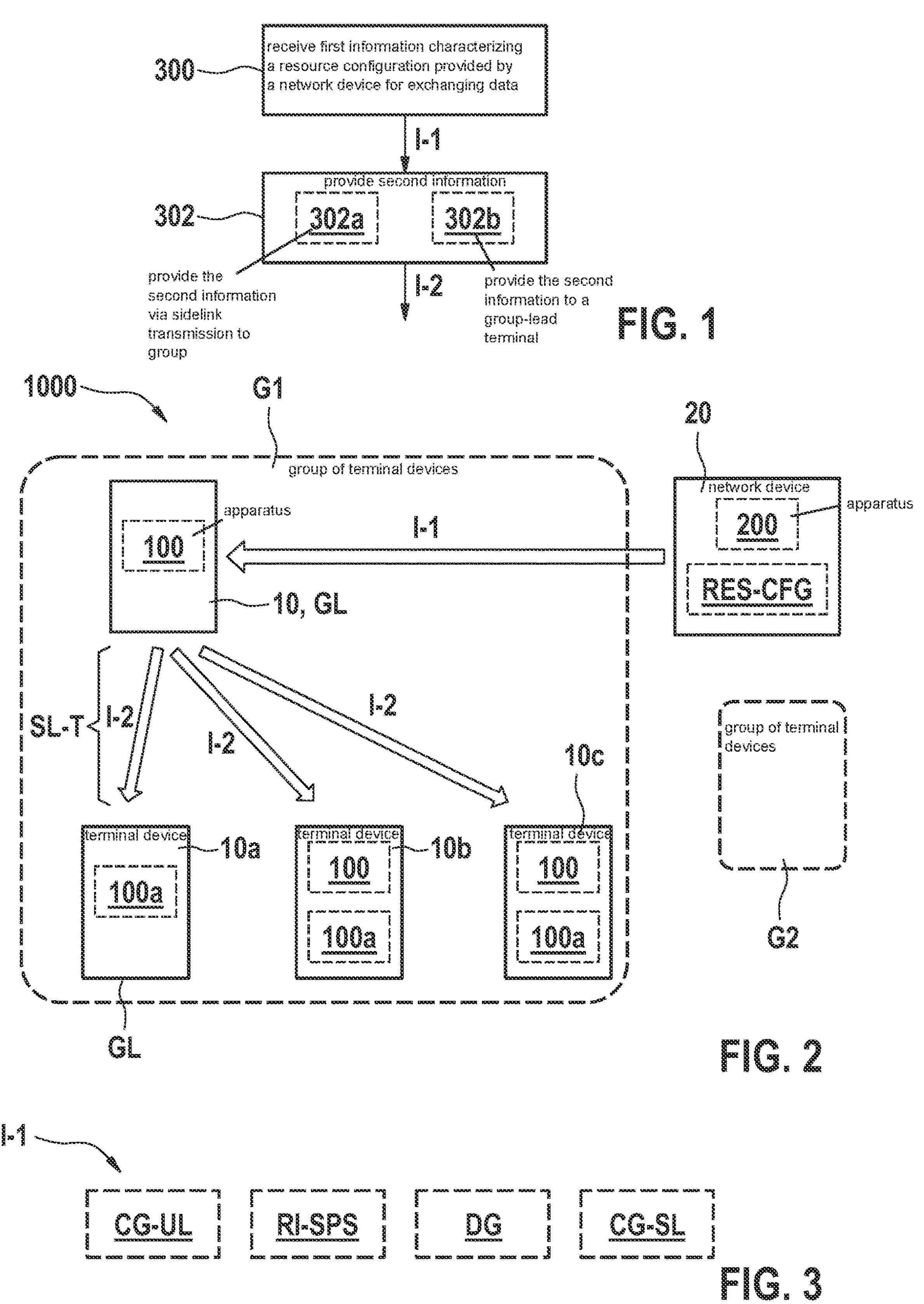
300
receive first information characterizing a resource configuration provided by a network device for exchanging data
I-1
302
provide second information
302a
302b
I-2
provide the second information via sidelink transmission to group
provide the second information to a group-lead terminal
FIG. 1
1000
G1
group of terminal devices
apparatus
100
10, GL
I-1
20
network device
200
apparatus
RES-CFG
SL-T
I-2
I-2
I-2
10c
terminal device
100a
10a
terminal device
100
100a
10b
terminal device
100
100a
group of terminal devices
G2
GL
FIG. 2
I-1
CG-UL
RI-SPS
DG
CG-SL
FIG. 3

METHOD AND APPARATUS FOR RECEIVING INFORMATION

CROSS REFERENCE

The present application claims the benefit under 35 U.S.C. § 119 of European Patent Application No. EP 22 16 5996.4 filed on Mar. 31, 2022, which is expressly incorporated herein by reference in its entirety.

FIELD

The present invention relates to a method for receiving information by a terminal device.

The present invention further relates to an apparatus for receiving information, e.g. for a terminal device.

SUMMARY

Exemplary embodiments of the present invention relate to a method, for example a computer-implemented method, comprising: receiving, by a first terminal device, first information characterizing a resource configuration provided by a network device for a data exchange between a) the network device and at least one terminal device and/or b) at least two terminal devices, providing second information based on the first information via at least one sidelink transmission to at least one further terminal device. In some embodiments, this enables to, for example efficiently, share or distribute information associated with the resource configuration provided by a network device with or to other terminal devices.

In some example embodiments of the present invention, the first terminal device and/or the at least one further terminal device can e.g. be used with a wireless, for example cellular, communications system, which is for example based on and/or adheres at least partially to at least one third generation partnership project, 3GPP, radio standard such as 4G (fourth generation), 5G (fifth generation) or other radio access technology.

In some example embodiments of the present invention, the first terminal device and/or the at least one further terminal device may be a user equipment (UE) or a data transceiver modem, which, for example, may be associated with a mobile object such as e.g. a vehicle, for example car or truck or the like.

In some example embodiments of the present invention, the first terminal device and/or the at least one further terminal device may be at least one of: an IoT (Internet of Things) device, an infrastructure component or part of an infrastructure component (e.g., traffic lights, street lights, traffic sign, toll gate), an industrial automation component, e.g. IIoT (Industrial IoT) component or infrastructure (e.g., robots, machines, etc.), a device for a mobile broadband user, and/or a vehicle.

In some example embodiments of the present invention, the network device is a base station, e.g. for a wireless, for example cellular, communications system, which is for example based on and/or adheres at least partially to at least one third generation partnership project, 3GPP, radio standard such as 4G (fourth generation), 5G (fifth generation) or other radio access technology.

In some example embodiments of the present invention, the network device may, e.g., be a gNB.

In some example embodiments of the present invention, the first information comprises at least one of: a) configured grant information associated with at least one uplink data transmission to the network device, b) resource information associated with semi-persistent scheduling, SPS, c) dynamic grant associated with time and/or frequency resources, e.g. non-periodic, d) configured grant information associated with at least one sidelink data transmission.

In some example embodiments of the present invention, the method comprises: providing the second information via the at least one sidelink transmission to a predetermined group of further terminal devices.

In some example embodiments of the present invention, the method comprises: dividing a period associated with a configured grant into a plurality of shares, and, optionally, assigning at least one share of the plurality of shares to the at least one further terminal device.

In some example embodiments of the present invention, the method comprises: forming, by the first terminal device, together with the at least one further terminal device, a group, for example of sidelink transmission-based, for example group-managed, terminal devices capable of exchanging data with each other using sidelink transmissions. In some embodiments, such group may also exemplarily be referred to as a "sidelink (SL)-managed group".

In some example embodiments of the present invention, the method comprises the first terminal device at least temporarily assuming the role of a group-lead of the group, e.g. being connected to the network. In some other embodiments, at least one further terminal device may at least temporarily assume the role of a group-lead of the group.

In some example embodiments of the present invention, providing the second information to the at least one further terminal device comprises providing the second information to a group-lead terminal device of the group, wherein for example, the group-lead terminal device may transmit the second information, for example using group-cast transmissions, to all other members of the group.

In some example embodiments of the present invention, the method provides that a hybrid automatic repeat request, HARQ, mechanism is, for example at least temporarily, used for providing protection to a transmission of the second information to the at least one further terminal device.

In some example embodiments of the present invention, the method comprises: synchronizing a use of resources associated with at least one of the first information and the second information, for example by synchronizing the use of the resources associated with at least one of the first information and the second information within a group of, for example of sidelink transmission-based, for example group-managed, terminal devices capable of exchanging data with each other using sidelink transmissions, e.g. a SL-managed group.

In some example embodiments of the present invention, the group, e.g. SL-managed group, comprises terminal devices which are at least temporarily collocated or nearby each other.

In some example embodiments of the present invention, the method comprises at least one of: a) indicating, by the first terminal device, a group-lead of the group to at least one of a1) at least one further terminal device, wherein for example the at least one further terminal device is a member of the group, a2) a network device, for example a gNB and/or a cloud device and/or an edge device, b) maintaining, by the first terminal device, a connectivity to the network device for terminal devices belonging to the group, c) maintaining the first terminal device in an active state. This way, in some embodiments, the first terminal device can efficiently exchange information such as e.g. user data and/or control data or the like with the gNB. In addition, in some embodiments, the first terminal device can efficiently relay the second information received from the network device, e.g. gNB, to e.g. at least one further terminal device, e.g. of the group.

In some example embodiments of the present invention, the method comprises at least one of: a) notifying members of the group that the first terminal device intends to leave the group, b) determining a new group lead, which, for example, is designated to perform a data exchange with the network device, for example for at least one member of the group.

In some example embodiments of the present invention, the method comprises: receiving, by the first terminal device, third information characterizing handover conditions for a conditional handover, CHO, procedure, from the network device, and transmitting at least a part of the third information to the at least one further terminal device, for example to at least one member of a or the group of, for example of sidelink transmission-based, for example group-managed, terminal devices capable of exchanging data with each other using sidelink transmissions. In some embodiments, this enables to efficiently propagate CHO-related information to other terminal devices, e.g. via sidelink transmissions.

In some example embodiments of the present invention, the method comprises: receiving, by the first terminal device, fourth information characterizing a configuration or reconfiguration associated with the CHO, and transmitting at least a part of the fourth information to the at least one further terminal device, for example to at least one member of a or the group of, for example of sidelink transmission-based, for example group-managed, terminal devices capable of exchanging data with each other using sidelink transmissions.

In some example embodiments of the present invention, the method comprises: receiving, by the first terminal device, fifth information from at least one further terminal device, e.g. from at least one member of a or the group of, for example of sidelink transmission-based, for example group-managed, terminal devices capable of exchanging data with each other using sidelink transmissions (e.g., a SL-managed group), the fifth information characterizing a message and at least one indicator indicating whether a) the message relates to a local safety, e.g. a safety associated with the group, and/or whether b) the message relates to a network safety, e.g. a safety associated with the network, and, based on the at least one indicator, providing at least the message, optionally at least one further portion of the fifth information, to at least one of b1) a further terminal device, for example of the group, b2) the network device. In some embodiments, this enables an efficient path switching for transmitting, e.g. forwarding or relaying, the message and/or other parts of the fifth information, e.g. via an appropriate link such as e.g. a sidelink or for example a radio interface to the network interface, e.g. Uu interface ("air interface" to the network device).

In some example embodiments of the present invention, the fifth information may, for example alternatively or additionally, be used for at least one of group coordination and group-to-network connection maintenance.

In some example embodiments of the present invention, the method comprises: processing the fifth information, wherein the processing comprises at least one of: a) determining whether multiple, for example potentially redundant, messages are associated with the fifth information, b) filtering at least a part of the fifth information, c) aggregating at least a part of the fifth information.

Further exemplary embodiments of the present invention relate to a method, for example a computer-implemented method, comprising: receiving, by a second terminal device, second information from a first terminal device via at least one sidelink transmission, the second information for example being derivable by the first terminal device based on first information provided by a network device to the first terminal device, the first information characterizing a resource configuration for a data exchange between a) the network device and at least one terminal device and/or b) at least two terminal devices, and, optionally, performing a data exchange, e.g., transmitting and/or receiving, with the network device (e.g., over an air interface, e.g. Uu interface) and/or at least one further terminal device (e.g., using a sidelink) based on the second information. In some embodiments, this enables the second terminal device to efficiently use configured resources for the data exchange, wherein the resources have e.g. been configured earlier by the network device which has notified the first terminal device on the configured resources, e.g. using the first information.

In some example embodiments of the present invention, the method comprises: updating the second information, whereby updated second information is obtained, and, optionally, transmitting the updated second information to the first terminal device and/or a group lead of a group of, for example sidelink transmission-based, for example group-managed, terminal devices capable of exchanging data with each other using sidelink transmissions.

In some example embodiments of the present invention, the method comprises entering, by the second terminal device, at least one of: a) an inactive mode, b) an idle mode, for example after receiving the second information or after transmitting the updated second information.

In some example embodiments of the present invention, the second terminal device may e.g. switch to an idle/inactive mode, e.g. over the Uu interface, but may for example maintain sidelink connectivity.

In some example embodiments of the present invention, the method comprises at least one of: a) transmitting data, the data for example relating to a local safety, for example to a safety associated with a or the group of terminal devices, via at least one sidelink transmission, to at last one further terminal device, transmitting data, the data for example relating to a safety related to a network, via at least one sidelink transmission, to at last one further terminal device, for example for a transmission to the network device by the at last one further terminal device.

Further exemplary embodiments of the present invention relate to an apparatus, for example for a terminal device, for performing the method according to the embodiments.

In some example embodiments of the present invention, the apparatus may be implemented in the first terminal device and/or the second terminal device and/or at least one further terminal device.

Further exemplary embodiments of the present invention relate to a method, for example a computer-implemented method, comprising: determining, by a network device, e.g. gNB, a resource configuration for a data exchange between at least one of a) the network device and at least one terminal device and/or b) at least two terminal devices, transmitting first information characterizing the resource configuration to at least a first terminal device, e.g. to the first terminal device exemplarily disclosed above.

In some example embodiments of the present invention, the method comprises: providing at least two resource sets and/or two resource pools and assigning respective resources of the at least two resource sets and/or resource pools to a respective group of terminal devices. In some embodiments, the at least two resource sets may be in a same resource pool. In some embodiments, this enables to reduce inter-group interference.

Further exemplary embodiments of the present invention relate to an apparatus, for example for a network device, e.g. gNB, for performing the method according to the embodiments.

In some example embodiments of the present invention, the apparatus may be implemented in the network device, e.g. gNB.

Further exemplary embodiments of the present invention relate to a communication system comprising at least one apparatus according to the embodiments.

Further exemplary embodiments of the present invention relate to a computer program comprising instructions which, when the program is executed by a computer, cause the computer to carry out the method according to the embodiments.

Further exemplary embodiments of the present invention relate to a computer-readable storage medium comprising instructions which, when executed by a computer, cause the computer to carry out the method according to the embodiments.

Further exemplary embodiments of the present invention relate to a data carrier signal carrying and/or characterizing the computer program according to the embodiments.

Further exemplary embodiments of the present invention relate to a use of the method according to the embodiments and/or of the apparatus according to the embodiments and/or of the communication system according to the embodiments and/or of the computer program according to the embodiments and/or of the computer-readable storage medium according to the embodiments and/or of the data carrier signal according to the embodiments for at least one of: a) sharing information on the resource configuration provided by the network device with at least one further terminal device, b) enabling at least one further terminal device to, for example quickly, access a channel, for example Uu channel, for transmitting data to the network device, c) platooning, for example for exchanging information between terminal devices associated with a platoon, d) determining, e.g. finding, a platoon of several terminal devices, e) merging of platoons, e.g. combining terminal devices associated with a plurality of first platoons to form a second platoon, f) coordinating a data exchange between terminal devices, e.g. of a group of terminal devices, and the network device, g) coordinating a data exchange between different terminal devices, e.g. of a group of terminal devices, h) managing a plurality of terminal devices, for example related to h1) a usage of resources for inter-terminal device communication, for example via a sidelink transmission, and/or related to h2) a usage of resources for an uplink information exchange with the network device, and/or related to h3) a usage of resources for a downlink information exchange with the network device, i) enabling at least one terminal device to determine whether to transmit data via a sidelink transmission and/or via another transmission which is different from a sidelink transmission, wherein the determination may for example be based on at least one of: a, for example required, latency, a service availability, a reliability, j) reducing latency in a communications system, k) shifting resource management at least temporarily and/or at least partly from the network device to at least one terminal device, l) improving an interoperability of sidelink data transmissions and uplink data transmissions and/or downlink data transmissions, m) providing a unified methodology for accessing uplink data transmissions and/or downlink data transmissions, for example in a, for example coordinated, group-cast manner, for example by at least one terminal device.

BRIEF DESCRIPTION OF THE DRAWINGS

Some exemplary embodiments of the present invention will be described with reference to the figures.

FIG. 1 schematically depicts a simplified flow-chart according to exemplary embodiments of the present invention.

FIG. 2 schematically depicts a simplified block diagram according to exemplary embodiments of the present invention.

FIG. 3 schematically depicts a simplified block diagram according to exemplary embodiments of the present invention.

DETAILED DESCRIPTION OF EXAMPLE EMBODIMENTS

Figure 4:
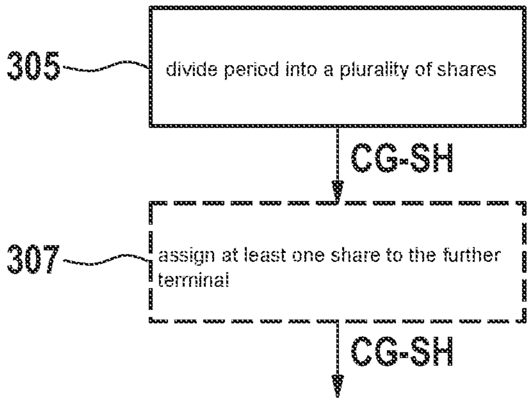
FIG. 4 schematically depicts a simplified flow-chart according to exemplary embodiments of the present invention.

Exemplary embodiments, see for example FIG. 1, relate to a method, for example a computer-implemented method, comprising: receiving 300, by a first terminal device 10 (FIG. 2), first information I-1 characterizing a resource configuration RES-CFG provided by a network device 20 for a data exchange between a) the network device 20 and at least one terminal device 10, 10*a*, 10*b*, 10*c* and/or b) at least two terminal devices 10, 10*a*, 10*b*, 10, providing 302 (FIG. 1) second information I-2 based on the first information I-1 via at least one sidelink transmission SL-T (FIG. 2) to at least one further terminal device 10*a*, 10*b*, 10*c*. In some embodiments, this enables to, for example efficiently, share or distribute information I-1, I-2 associated with the resource configuration RES-CFG provided by the network device 20 with or to the other terminal devices 10*a*, 10*b*, 10*c*.

In some embodiments, the first terminal device 10 and/or the at least one further terminal device 10*a*, 10*b*, 10*c* can e.g. be used with a wireless, for example cellular, communications system 1000 or network, respectively, which is for example based on and/or adheres at least partially to at least one third generation partnership project, 3GPP, radio standard such as 4G (fourth generation), 5G (fifth generation) or other radio access technology.

In some embodiments, the first terminal device 10 and/or the at least one further terminal device 10*a*, 10*b*, 10*c* may be a user equipment (UE) or a data modem, which, for example, may be associated with a mobile object such as e.g. a vehicle, for example car or truck or the like.

In some embodiments, the first terminal device 10 and/or the at least one further terminal device 10*a*, 10*b*, 10*c* may be at least one of: an IoT (Internet of Things) device, an infrastructure component or part of an infrastructure component (e.g., traffic lights, street lights, traffic sign, toll gate), an industrial automation component, e.g. IIoT (Industrial IoT) component or infrastructure (e.g., robots, machines, etc.), a device for a mobile broadband user, and/or a vehicle.

In some embodiments, the network device 20 is a base station, e.g. for a wireless, for example cellular, communications system 1000, which is for example based on and/or adheres at least partially to at least one third generation partnership project, 3GPP, radio standard such as 4G (fourth generation), 5G (fifth generation) or other radio access technology.

In some embodiments, the network device 20 may e.g. be a gNB.

In some embodiments, FIG. 3, the first information I-1 comprises at least one of: a) configured grant information CG-UL associated with at least one (e.g., future) uplink data transmission to the network device 20, b) resource information RI-SPS associated with semi-persistent scheduling, SPS, c) dynamic grant DG associated with time and/or frequency resources, e.g. non-periodic, d) configured grant information CG-SL associated with at least one (e.g., future) sidelink data transmission.

In some embodiments, FIG. 1, the method comprises: providing 302*a* the second information I-2 via the at least one sidelink transmission SL-T (FIG. 2) to a predetermined group G1 of further terminal devices. In some embodiments, the first terminal device 10 may also be a member of the group G1.

In some embodiments, FIG. 4, the method comprises: dividing 305 a period associated with a configured grant into a plurality of shares CG-SH, and, optionally, assigning 307 at least one share of the plurality of shares CG-SH to the at least one further terminal device 10*a*, 10*b*, 10*c*.

Figure 5:
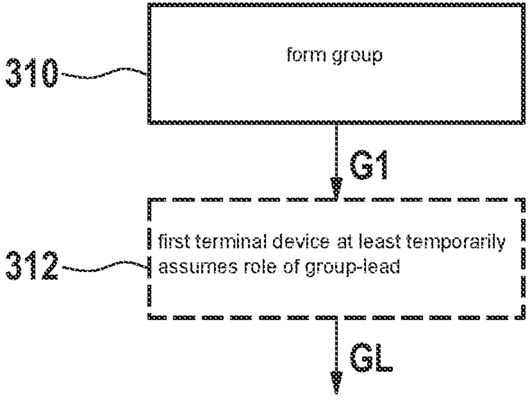
FIG. 5 schematically depicts a simplified flow-chart according to exemplary embodiments of the present invention.

In some embodiments, FIG. 5, the method comprises: forming 310, by the first terminal device 10 (FIG. 2), together with the at least one further terminal device 10*a*, 10*b*, 10*c*, a group G1, for example of sidelink transmission-based, for example group-managed, terminal devices capable of exchanging data with each other using sidelink transmissions SL-T. In some embodiments, such group G1 may also exemplarily be referred to as a "sidelink (SL)-managed group".

In some embodiments, FIG. 5, the method comprises the first terminal device 10 at least temporarily assuming 312 the role of a group-lead GL of the group G1, e.g. being connected to the network. In some other embodiments, at least one further terminal device 10*a*, 10*b*, 10*c* (FIG. 2) may at least temporarily assume the role of a group-lead GL of the group G1.

In some embodiments, FIG. 1, providing 302 the second information I-2 to the at least one further terminal device comprises providing 302*b* the the second information I-2 to a group-lead GL (FIG. 2) terminal device 10*a* of the group, wherein for example, the group-lead terminal device 10*a* may transmit, e.g. relay, the second information I-2, for example using group-cast sidelink transmissions SL-T, to, for example all, other members 10*b*, 10*c* of the group G1, or, for example using unicast to at least some other member of the group G1, for example to each other member of the group G1.

In some embodiments, the method provides that a hybrid automatic repeat request, HARQ, mechanism is, for example at least temporarily, used for providing protection to a transmission of the second information I-2 to the at least one further terminal device 10*b*, 10*c*.

Figure 6:
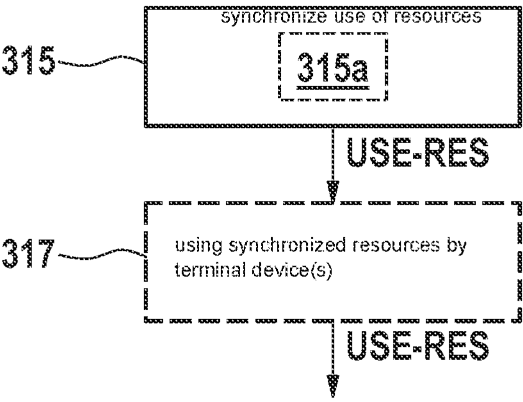
FIG. 6 schematically depicts a simplified flow-chart according to exemplary embodiments of the present invention.

In some embodiments, FIG. 6, the method comprises: synchronizing 315 *a* use USE-RES of resources associated with at least one of the first information I-1 and the second information I-2, for example by synchronizing 315*a* the use USE-RES of the resources associated with at least one of the first information and the second information within a group G1 (FIG. 2) of, for example of sidelink transmission-based, for example group-managed, terminal devices capable of exchanging data with each other using sidelink transmissions, e.g. a SL-managed group. The optional block 317 of FIG. 6 symbolizes using the synchronized resources, e.g. by one or more terminal devices 10, 10*a*, 10*b*, 10*c* of the group G1.

In some embodiments, the group, e.g. SL-managed group, G1 comprises terminal devices 10, 10*a*, 10*b*, 10*c* which are at least temporarily collocated or nearby each other.

Figure 7:
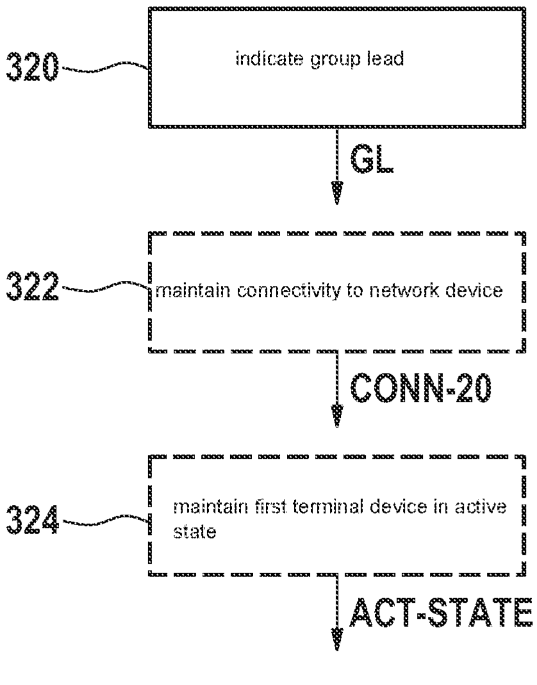
FIG. 7 schematically depicts a simplified flow-chart according to exemplary embodiments of the present invention.

In some embodiments, FIG. 7, the method comprises at least one of: a) indicating 320, by the first terminal device 10 (FIG. 2), a group-lead GL of the group G1 to at least one of a1) at least one further terminal device 10*b*, 10*c*, wherein for example the at least one further terminal device 10*b*, 10*c* is a member of the group G1, a2) a network device, for example the gNB and/or a cloud device (not shown) and/or an edge device (not shown), b) maintaining 322 (FIG. 7), by the first terminal device 10, a connectivity CONN-20 to the network device 20 for terminal devices 10*a*, 10*b*, 10*c* belonging to the group G1, c) maintaining 324 the first terminal device 10 in an active state. This way, in some embodiments, the first terminal device 10 can efficiently exchange information such as e.g. user data and/or control data or the like with the gNB. In addition, in some embodiments, the first terminal device 10 can efficiently relay the second information I-2 received from the gNB 20 to e.g. at least one further terminal device, e.g. of the group G1.

Figure 8:
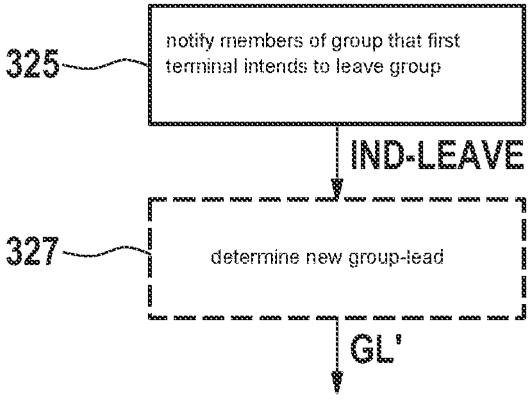
FIG. 8 schematically depicts a simplified flow-chart according to exemplary embodiments of the present invention.

In some embodiments, FIG. 8, the method comprises at least one of: a) notifying 325 members 10*a*, 10*b*, 10*c* of the group G1 that the first terminal device 10 intends to leave the group G1, b) determining 327 a new group lead GL', which, for example, is designated to perform a data exchange with the network device 20, for example for at least one member 10*b*, 10*c* of the group.

Figure 9:
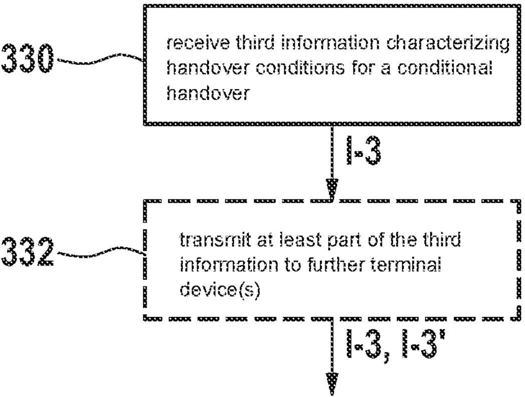
FIG. 9 schematically depicts a simplified flow-chart according to exemplary embodiments of the present invention.

In some embodiments, FIG. 9, the method comprises: receiving 330, by the first terminal device 10, third information I-3 characterizing handover conditions for a conditional handover, CHO, procedure, from the network device 20, and transmitting 332 at least a part I-3' of the third information I-3 to the at least one further terminal device 10*a*. 10*b*, 10*c*, for example to at least one member of a or the group G1. In some embodiments, this enables to efficiently propagate CHO-related information I-3', I-3 to other terminal devices, e.g. via sidelink transmissions SL-T.

Figure 10:
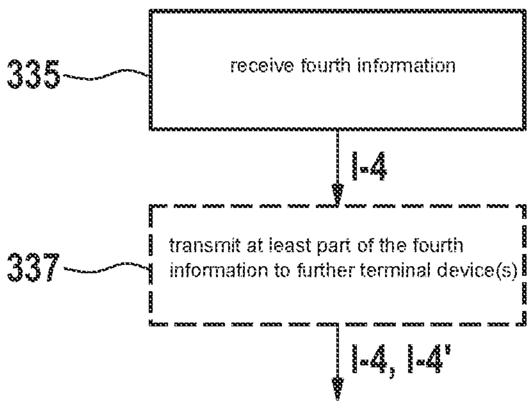
FIG. 10 schematically depicts a simplified flow-chart according to exemplary embodiments of the present invention.

In some embodiments, FIG. 10, the method comprises: receiving 335, by the first terminal device 10, fourth information I-4 characterizing a configuration or reconfiguration associated with the CHO, and transmitting 337 at least a part I-4' of the fourth information I-4 to the at least one further terminal device 10*b*, 10*c*, for example to at least one member of the group G1.

Figure 11:
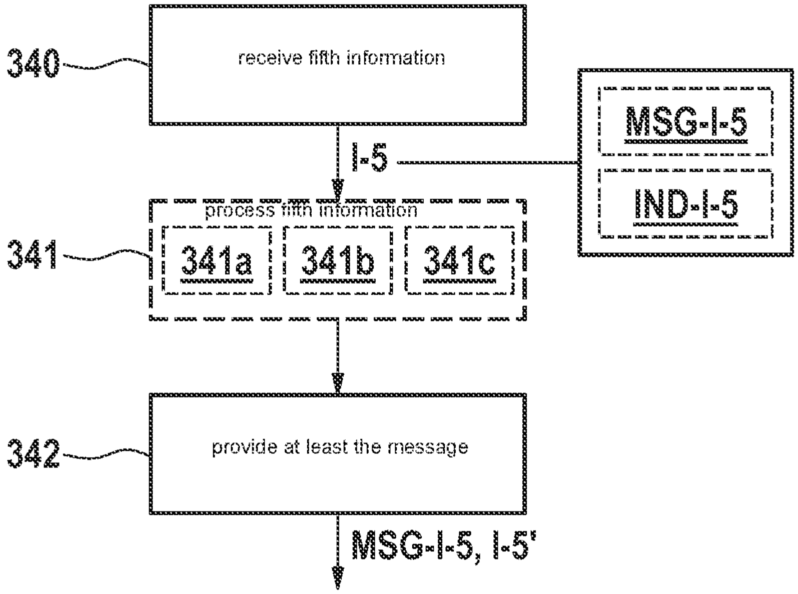
FIG. 11 schematically depicts a simplified flow-chart according to exemplary embodiments of the present invention.

In some embodiments, FIG. 11, the method comprises: receiving 340, by the first terminal device 10, fifth information I-5 from at least one further terminal device 10*a*, 10*b*, 10*c*, e.g. from at least one member of the group G1 (e.g., an SL-managed group), the fifth information I-5 characterizing a message MSG-I-5 (e.g. from the at least one further terminal device) and at least one indicator IND-I-5 indicating whether a) the message MSG-I-5 relates to a local safety, e.g. a safety associated with the group G1, and/or whether b) the message MSG-I-5 relates to a network safety, e.g. a safety associated with the network 1000, and, based on the at least one indicator IND-I-5, providing 342 at least the message MSG-I-5, optionally at least one further portion I-5' of the fifth information I-5, to at least one of b1) a further terminal device 10*b*, 10*c*, for example of the group G1, b2) the network device 20. In some embodiments, this enables an efficient path switching for transmitting, e.g. forwarding or relaying, the message MSG-I-5 and/or other parts I-5' of the fifth information I-5, e.g. via an appropriate link such as e.g. a sidelink or for example a radio interface to the network interface, e.g. Uu interface ("air interface" to the network device).

In some embodiments, FIG. 11, the method comprises: processing 341 the fifth information I-5, wherein the processing 341 comprises at least one of: a) determining 341*a* whether multiple, for example potentially redundant, messages are associated with the fifth information I-5 (e.g., as may be received from a plurality of other terminal devices), b) filtering 341*b* at least a part of the fifth information I-5 (e.g. to eliminate redundant messages or information, respectively), c) aggregating 341*c* at least a part of the fifth information I-5.

Figure 12:
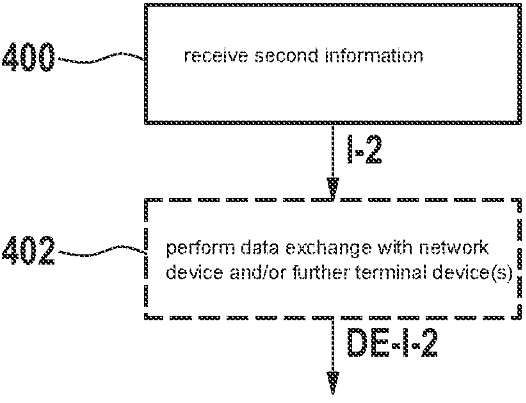
FIG. 12 schematically depicts a simplified flow-chart according to exemplary embodiments of the present invention.

Further exemplary embodiments, FIG. 12, relate to a method, for example a computer-implemented method, comprising: receiving 400, by a second terminal device 10*a* (FIG. 2), second information I-2 from a first terminal device 10 via at least one sidelink transmission SL-T, the second information I-2 for example being derivable by the first terminal device 10 based on first information I-1 provided by a network device 20 to the first terminal device 10, the first information I-1 characterizing a resource configuration RES-CFG for a data exchange between a) the network device 20 and at least one terminal device 10, 10*a*, 10*b*, 10*c* and/or b) at least two terminal devices 10, 10*a*, 10*b*, 10*c*, and, optionally, performing 402 a data exchange DE-I-2, e.g., transmitting and/or receiving, with the network device 20 (e.g., over an air interface, e.g. Uu interface) and/or at least one further terminal device (e.g., using a sidelink) based on the second information I-2. In some embodiments, this enables the second terminal device 10*a* to efficiently use configured resources for the data exchange, wherein, in some embodiments, the resources have e.g. been configured earlier by the network device 20, which has notified the first terminal device 10 on the configured resources, e.g. using the first information I-1.

Figure 13:
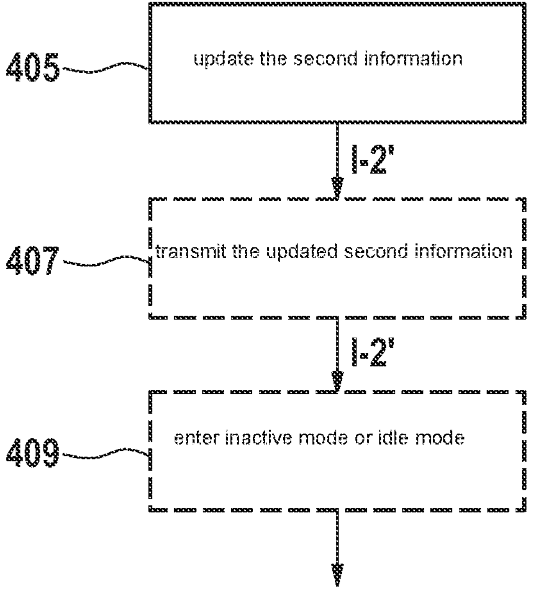
FIG. 13 schematically depicts a simplified flow-chart according to exemplary embodiments of the present invention.

In some embodiments, FIG. 13, the method comprises: updating 405 the second information I-2, whereby updated second information I-2' is obtained, and, optionally, transmitting 407 the updated second information I-2' to the first terminal device 10 and/or a group lead GL of the group G1.

In some embodiments, FIG. 13, the method comprises entering 409, by the second terminal device 10*a*, at least one of: a) an inactive mode, b) an idle mode, for example after receiving 400 (FIG. 12) the second information I-2 and/or after transmitting (FIG. 13, block 407) the updated second information I-2'.

In some embodiments, the second terminal device 10*a* may e.g. switch to an idle mode, e.g. over the Uu interface, but may for example maintain sidelink connectivity.

Figure 14:
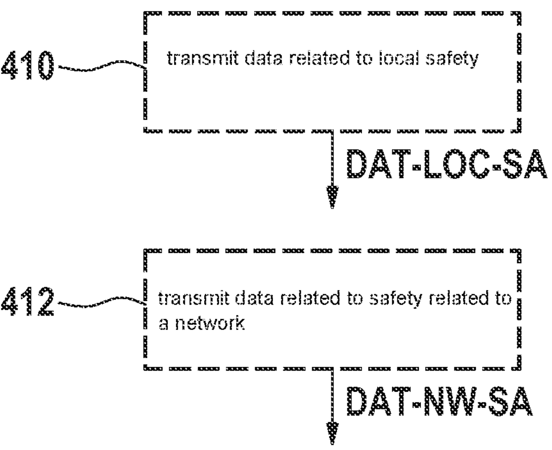
FIG. 14 schematically depicts a simplified flow-chart according to exemplary embodiments of the present invention.

In some embodiments, FIG. 14, the method comprises at least one of: a) transmitting 410 data DAT-LOC-SA, the data DAT-LOC-SA for example relating to a local safety, for example to a safety associated with a or the group G1 of terminal devices, via at least one sidelink transmission SL-T (FIG. 2), to at last one further terminal device 10, 10*b*, 10*c*, transmitting 412 (FIG. 14) data DAT-NW-SA, the data DAT-NW-SA for example relating to a safety related to a network 1000, via at least one sidelink transmission SL-T, to at last one further terminal device 10, for example for a transmission to the network device 20 by the at last one further terminal device 10.

Figure 15:
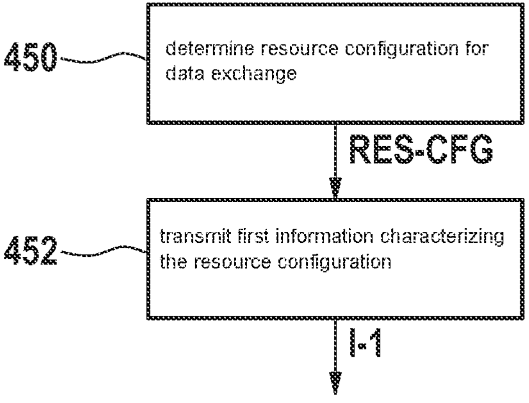
FIG. 15 schematically depicts a simplified flow-chart according to exemplary embodiments of the present invention.

Further exemplary embodiments, FIG. 15, relate to a method, for example a computer-implemented method, comprising: determining 450, by a network device, e.g. gNB, 20 (FIG. 2) a resource configuration RES-CFG for a data exchange between at least one of a) the network device 20 and at least one terminal device 10, 10*a*, 10*b*, 10*c* and/or b) at least two terminal devices 10, 10*a*, 10*b*, 10*c*, transmitting 452 first information I-1 characterizing the resource configuration RES-CFG to at least a first terminal device 19, e.g. to the first terminal device 10 exemplarily disclosed above.

Figure 16:
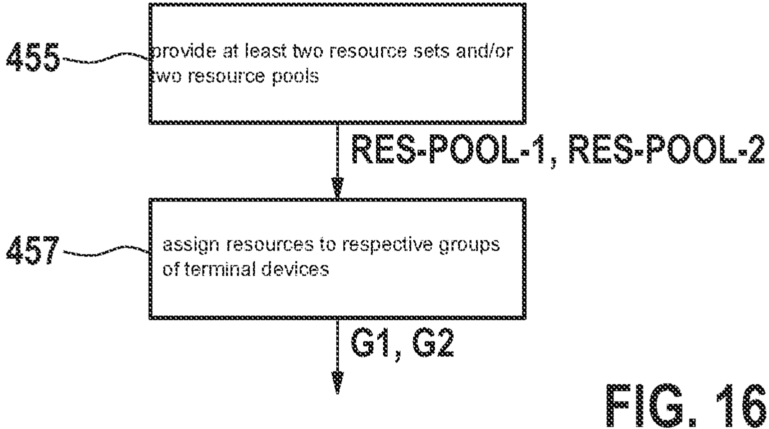
FIG. 16 schematically depicts a simplified flow-chart according to exemplary embodiments of the present invention.

In some embodiments, FIG. 16, the method comprises: providing 455 at least two resource sets and/or two resource pools RES-POOL-1, RES-POOL-2 and assigning 457 respective resources of the at least two resource sets and/or resource pools RES-POOL-1, RES-POOL-2 to a respective group G1, G2 of terminal devices. In some embodiments, this enables to reduce inter-group interference.

Further exemplary embodiments, FIG. 2, relate to an apparatus 100, 100*a*, for example for a terminal device 10, 10*a*, 10*b*, 10*c*, for performing the method according to the embodiments.

In some embodiments, the apparatus 100, 100*a* may be implemented in the first terminal device 10 and/or the second terminal device 10*a* and/or at least one further terminal device 10*b*, 10*c*.

In some embodiments, the apparatus 100 may be configured to perform at least some aspects of the method(s) exemplarily explained above with respect to FIG. 1 to FIG. 11.

In some embodiments, the apparatus 100*a* may be configured to perform at least some aspects of the method(s) exemplarily explained above with respect to FIG. 12 to FIG. 14.

Further exemplary embodiments, FIG. 2, relate to an apparatus 200, for example for a network device, e.g. gNB, 20, for performing the method according to the embodiments exemplarily explained above with respect to FIG. 15, 16.

In some embodiments, the apparatus 200 may be implemented in the network device, e.g. gNB 20.

Figure 17:
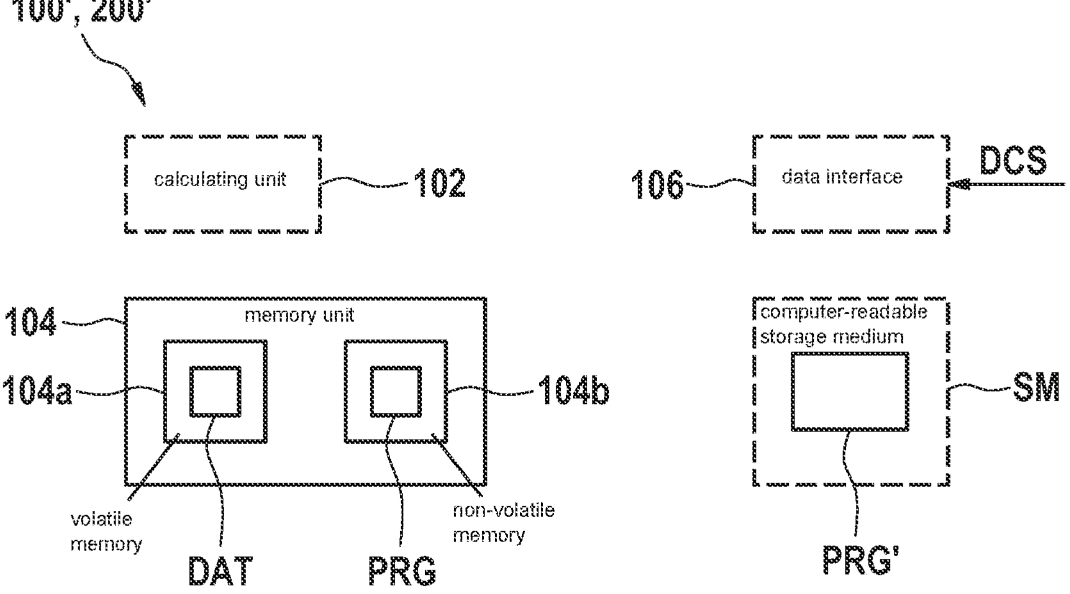
FIG. 17 schematically depicts a simplified block diagram according to exemplary embodiments of the present invention.

FIG. 17 schematically depicts a simplified block diagram according to further exemplary embodiments. The depicted configuration 100', 200' may e.g. be used for implementing at least one of the apparatus 100, 100', 200 according to the embodiments, e.g. for a terminal device and/or for a network device 20.

In some embodiments, the configuration 100', 200' comprises at least one calculating unit, e.g. processor, 102 and at least one memory unit 104 associated with (i.e., usably by) said at least one calculating unit 102 for at least temporarily storing a computer program PRG and/or data DAT, wherein said computer program PRG is e.g. configured to at least temporarily control an operation of the terminal device and/or the network device, e.g. the execution of a method according to the embodiments.

In some embodiments, the at least one calculating unit 102 comprises at least one core (not shown) for executing said computer program PRG or at least parts thereof, e.g. for executing the method according to the embodiments or at least one or more steps thereof.

According to further preferred embodiments, the at least one calculating unit 102 may comprise at least one of the following elements: a microprocessor, a microcontroller, a digital signal processor (DSP), a programmable logic element (e.g., FPGA, field programmable gate array), an ASIC (application specific integrated circuit), hardware circuitry, a tensor processor, a graphics processing unit (GPU). According to further preferred embodiments, any combination of two or more of these elements is also possible.

According to further preferred embodiments, the memory unit 104 comprises at least one of the following elements: a volatile memory 104*a*, particularly a random-access memory (RAM), a non-volatile memory 104*b*, particularly a Flash-EEPROM.

In some embodiments, said computer program PRG is at least temporarily stored in said non-volatile memory 104*b*. Data DAT (e.g. associated with the first information I-1 and/or the second information I-2 and the like), which may e.g. be used for executing the method according to the embodiments, may at least temporarily be stored in said RAM 104*a*.

In some embodiments, an optional computer-readable storage medium SM comprising instructions, e.g. in the form of a further computer program PRG', may be provided, wherein said further computer program PRG', when executed by a computer, i.e. by the calculating unit 102, may cause the computer 102 to carry out the method according to the embodiments. As an example, said storage medium SM may comprise or represent a digital storage medium such as a semiconductor memory device (e.g., solid state drive, SSD) and/or a magnetic storage medium such as a disk or harddisk drive (HDD) and/or an optical storage medium such as a compact disc (CD) or DVD (digital versatile disc) or the like.

In some embodiments, the configuration 100', 200' may comprise an optional data interface 106, e.g. for bidirectional data exchange with an external device (not shown). As an example, by means of said data interface 106, a data carrier signal DCS may be received, e.g. from said external device, for example via a wired or a wireless data transmission medium, e.g. over a (virtual) private computer network and/or a public computer network such as e.g. the Internet.

In some embodiments, the data carrier signal DCS may represent or carry the computer program PRG, PRG' according to the embodiments, or at least a part thereof.

Further exemplary embodiments, FIG. 2, relate to a communication system 1000 comprising at least one apparatus 100, 100*a*, 200 according to the embodiments.

Figure 18:
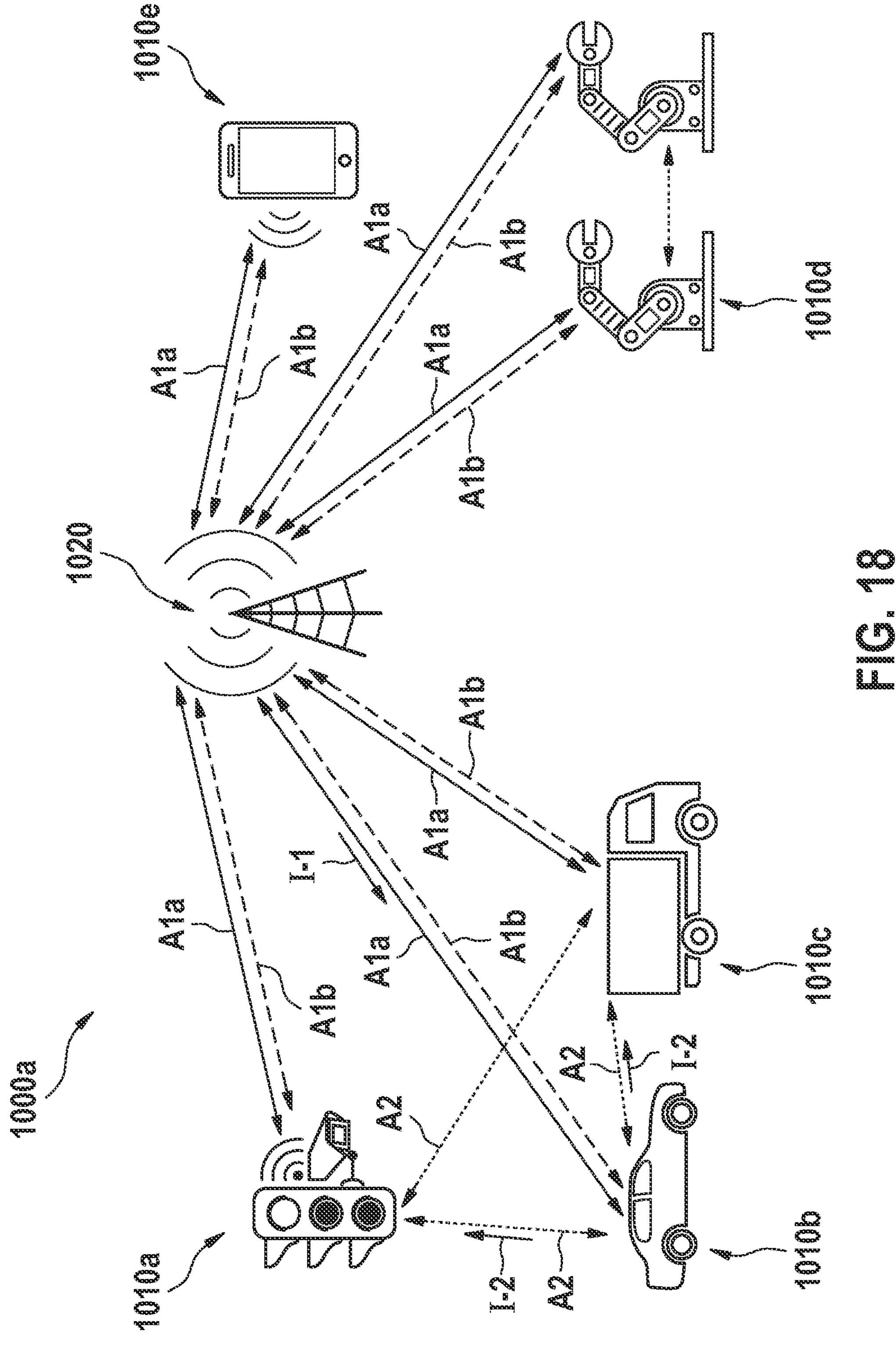
FIG. 18 schematically depicts a simplified block diagram according to exemplary embodiments of the present invention.

FIG. 18 schematically depicts a simplified block diagram according to further exemplary embodiments. Depicted is a communication network 1000*a*, e.g. based on and/or compatible with and/or adhering to a 5th generation (5G) new radio (NR) ("5G NR") communication standard, wherein aspects of the principle according to the embodiments exemplarily disclosed above can be used.

The network 1000*a* may e.g. comprise at least a next generation node base-station (gNB) 1020 and a plurality, e.g. set, of terminal devices associated with, and for illustrative purposes, in FIG. 18 symbolized by, respective devices such as e.g. infrastructure components such as a traffic light, vehicles such as at least one car and/or truck, industrial devices such as e.g. robots, and, for example mobile, user equipment (UE). In some embodiments, at least one terminal device associated with an exemplary traffic light is symbolized by reference sign 1010*a* in FIG. 18. In some embodiments, at least one terminal device associated with an exemplary car is symbolized by reference sign 1010*b*, at least one terminal device associated with an exemplary truck is symbolized by reference sign 1010*c*, at least one terminal device associated with exemplary (e.g., industry) robots is symbolized by reference sign 1010*d*, and at least one terminal device representing a UE is symbolized by reference sign 1010*e*.

In some embodiments, the gNB 1020 is used for controlling and/or communicating data to at least some, for example all, associated terminal devices 1010*a*, 1010*b*, . . . , 1010*e*, e.g. via a Uu interface, symbolized by the arrows A1*a* for a Uu data link and A1*b* for a Uu control link, in FIG. 18. In other words, in some embodiments, the Uu interface A1*a*, A1*b* represents a respective communication link between the gNB 1020 and one or more of the terminal devices 1010*a*, 1010*b*, . . . , 1010*e*.

As mentioned above, in some embodiments, the terminal devices may be at least one of: IoT or IIoT devices, an infrastructure (e.g., traffic lights, street lights, etc.), an, for example industrial, automation component (e.g., robots, machines, etc.), a mobile broadband user, and/or a vehicle (possibly also including aircraft and/or spacecraft in at least some embodiments) or system, e.g. drone and/or other uncrewed system, e.g. uncrewed aerial system (UAS) or unmanned aerial vehicles (UAV).

In some embodiments, single vehicles or their respective terminal devices 1010*a*, . . . , 1010*e* may communicate to the gNB 1020, and/or multiple devices, e.g. vehicles, (infrastructure) components or UE, or their respective terminal devices 1010*a*, . . . , 1010*e* may at least temporarily comprise and/or form a group (e.g., similar to groups G1, G2 of FIG. 2), where e.g. one or more vehicles or their respective terminal devices 1010*a*, . . . , 1010*e* are communicating to the gNB 1020, as well as to themselves, e.g. within the group.

In some embodiments, FIG. 18, e.g. when terminal devices 1010*a*, . . . , 1010*e* are communicating, e.g. directly, with other terminal devices 1010*a*, . . . , 1010*e*, a direct communication interface, e.g. of the PC5 type, may be used for establishing respective data and/or control links between the terminal devices, which is exemplarily symbolized by the arrows A2 of FIG. 18.

In some embodiments, for the Uu interface, two planes may be considered: the Uu User Plane (UP), e.g. for communicating data between the gNB 1020 (i.e., and the network) and the terminal devices. In some embodiments, the other plane may e.g. consider communicating control, i.e., control plane, between two respective entities, e.g. 1020 and 1010*a*.

In some embodiments, a control between the network 1000*a* and a terminal device 1010*a*, . . . , 1010*e* may, inter alia, comprise at least one of: a) master information block(s) (MIB), b) system information block(s) (SIB), and c) radio resource control (RRC) dedicated configurations.

In some embodiments, the gNB 1020 may indicate resources (e.g., which are to be used by at least one of the terminal devices, e.g. for information exchange via the Uu interface A1*a*, A1*b* and/or the PC5 interface A2) and/or instructions, e.g. for communication, via a, for example dedicated, lower layer (layer 1/L1 (physical layer) and/or layer 2/L2 (media access control layer) signaling. In some embodiments, control information, e.g. for dedicated L1 and/or L2 signaling, may be indicated to one or more terminal devices 1010*a*, . . . , 1010*e* via, e.g., dedicated L2 MAC control elements (MAC CE) and/or L1 downlink control information (DCI).

In some embodiments, the gNB 1020 of FIG. 18 may e.g. be used for at least one of: a) Uu communication of the terminal devices 1010*a*, . . . , 1010*e* with the gNB 1020, b) gNB-controlled sidelink transmissions, e.g. via the PC5 interface A2 (in some embodiments e.g. similar to element SL-T of FIG. 2).

In some embodiments, at least one of the terminal devices 1010*a*, . . . , 1010*e* of FIG. 18, for example the terminal device 1010*b* associated with the car, may at least temporarily perform aspects of the method according to the embodiments, e.g. for providing second information I-2 (which may e.g. be related to resources configured by the gNB 1020) via sidelink connections A2 to other terminal devices 1010*a*, 1010*c*, the second information I-2 e.g. based on first information I-1 as received by the terminal device 1010*b* from the gNB 1020, e.g. at least similar to the first terminal device 10 as explained above inter alia with reference to FIG. 2.

Figure 19:
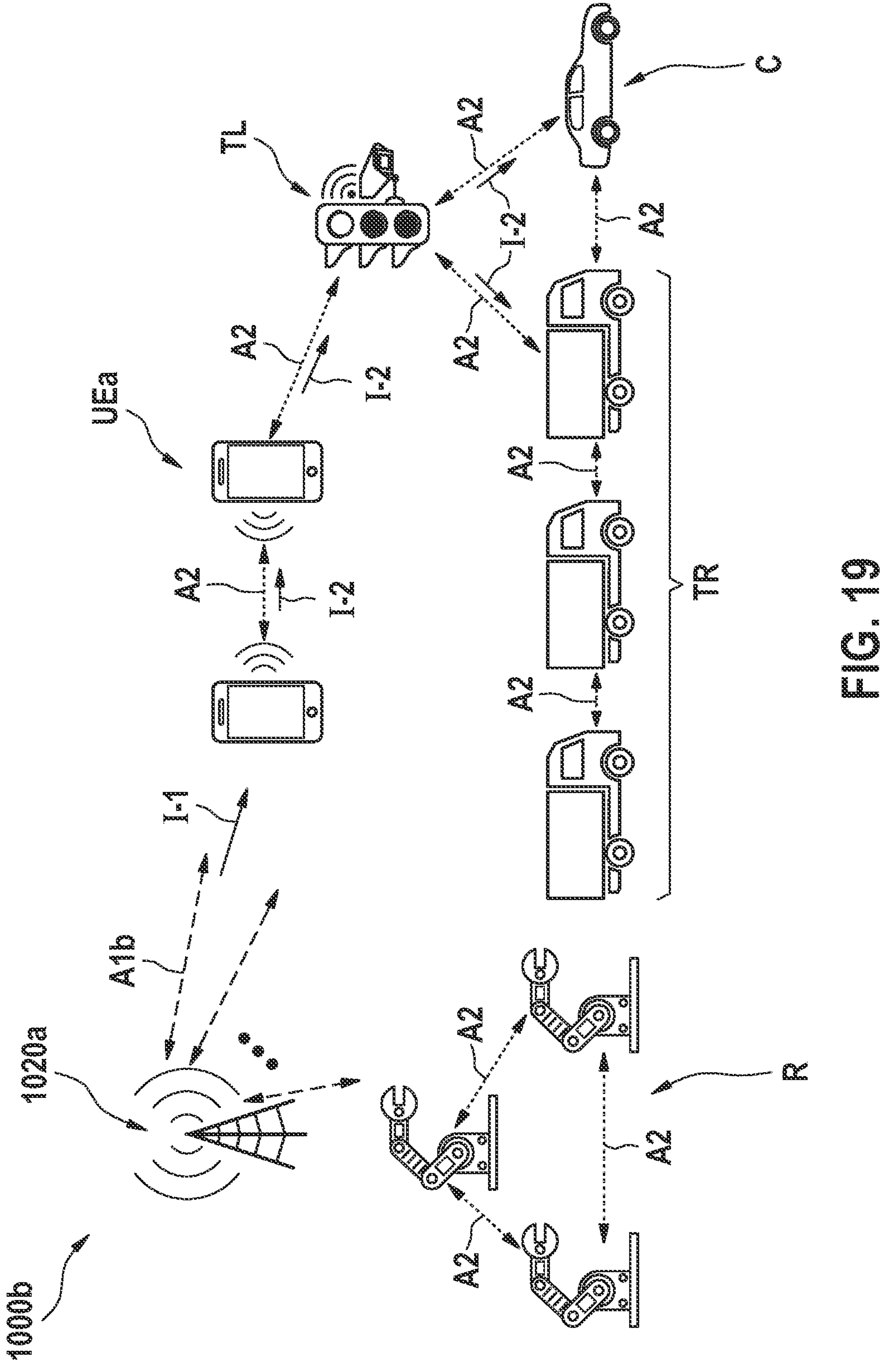
FIG. 19 schematically depicts a simplified block diagram according to exemplary embodiments of the present invention.

FIG. 19 schematically depicts a simplified block diagram according to further exemplary embodiments. Depicted is a further 5G NR compatible communication network 1000*b*, wherein aspects of the principle according to the embodiments exemplarily disclosed above can be used. As an example, one or more sidelink transmissions, e.g. between several terminal devices, which may e.g. be associated with different devices such as robots R and/or trucks TR and/or cars C and/or traffic lights and/or UE UEa, e.g. over respective PC5 data and/or control links A2, can at least temporarily be controlled by the gNB 1020*a*, e.g. via one or more, for example optional, Uu control links collectively denoted as A1*b*' in FIG. 19.

In some embodiments, another setup of the network 1000*b* may e.g. comprise terminal devices, e.g. associated with at least one of the elements R, TR, C, TL, UEa at least temporarily forming a network with or without the gNB 1020*a*. In some embodiments, for example when the gNB 1020 exists or is active, the gNB 1020 may send control information e.g. regarding at least one of synchronization, communication modes and/or dedicated radio resources, e.g. via the Uu control link(s) A1*b*'.

In some embodiments, in the exemplary network 1000*b* of FIG. 19, multiple terminal devices R, TR, C, TL, UEa can e.g. at least temporarily operate with autonomous resource allocation. In some embodiments, at least some resources may e.g. be preconfigured or configured by the gNB 1020*a* (if existing or available, e.g. active).

In some embodiments, for example additionally or alternatively to the proposal of the preceding paragraph, the gNB 1020*a* may configure e.g. some licensed bands that terminal devices are allowed to allocate resources and communicate autonomously, e.g. with other terminal devices, e.g. via sidelink transmissions, e.g. over the PC5 interface A2. In some embodiments, the terminal devices in this autonomous mode may e.g. be connected to the gNB 1020*a* in active (i.e., connected), inactive or idle mode, e.g. e.g. RRC_CONNECTED, RRC_INACTIVE, RRC_IDLE according to some accepted standard.

In some embodiments, e.g. if at least one gNB 1020*a* exists, one or more of the terminal devices may also at least temporarily switch to a, for example fully, controlled mode, as e.g. depicted by FIG. 18.

In some embodiments, at least one of the terminal devices R, TR, C, TL, UEa of FIG. 19, for example at least one of the terminal devices UEa e.g. representing UE, may at least temporarily perform aspects of the method according to the embodiments, e.g. for providing, e.g. relaying and/or forwarding, second information I-2 (which may e.g. be related to resources configured by the gNB 1020*a*) via sidelink connections A2 to other terminal devices UEa, TL, the second information I-2 e.g. being based on first information I-1 as e.g. received by at least one UE from the gNB 1020*a*, e.g. at least similar to the first terminal device 10 as explained above inter alia with reference to FIG. 2.

In some embodiments, for example the terminal device associated with the traffic light TL may relay, e.g. forward, second information I-2 as received from the UE UEa, e.g. to further terminal devices such as e.g. associated with the car C or at least one of the trucks TR.

Figure 20:
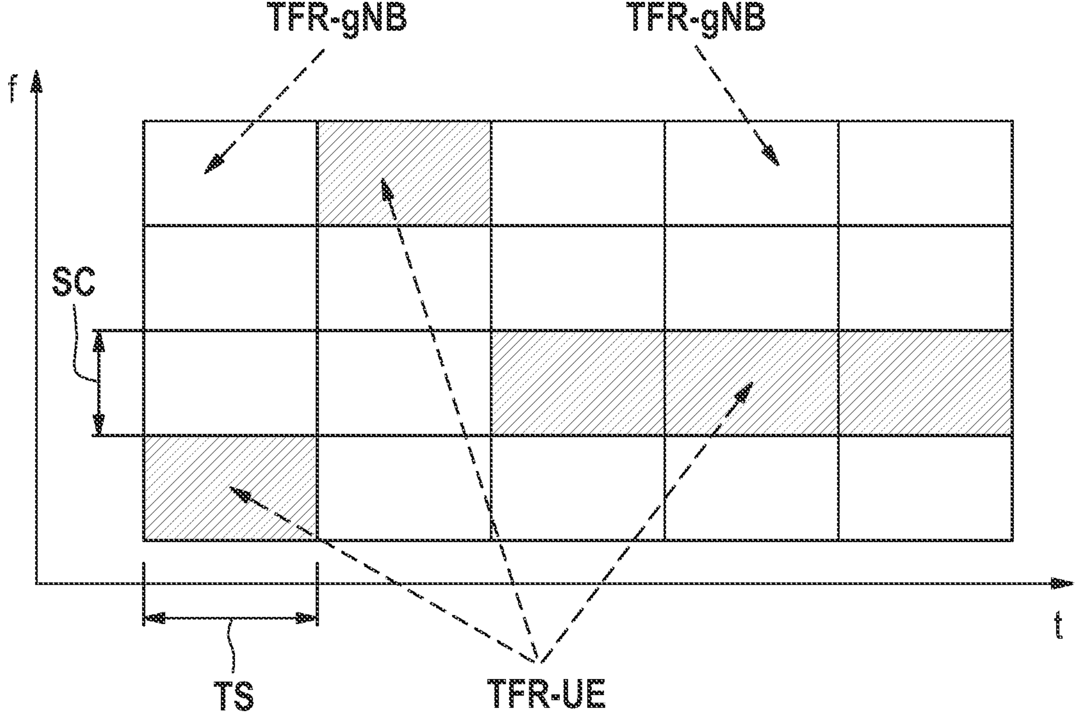
FIG. 20 schematically depicts a simplified time/frequency resource diagram according to exemplary embodiments of the present invention.

In some embodiments, e.g. for resource allocation and/or indication and/or configuration, the gNB 1020*a* may e.g.

configure and/or indicate resources to one or more terminal devices, the resources e.g. comprising resources in time and/or frequency, see for example FIG. 20, which schematically depicts exemplary time/frequency resources according to some embodiments, wherein the horizontal axis t characterizes time, and wherein the vertical axis f characterizes frequency. As an example, reference sign TS symbolizes a time slot, and reference sign SC symbolizes a frequency resource block, e.g. sub-channel, as may be used in at least some embodiments.

In some embodiments, resources in the time dimension t may comprise at least one of time slot(s), subframe number(s), time symbol index/indices, and/or other synchronization parameter(s). In some embodiments, for frequency resources, see axis f of FIG. 20, the gNB 20, 1020, 1020*a* may e.g. indicate frequency resources to be allocated either contiguously or non-contiguously.

As an example, in some embodiments, the reference signs TFR-gNB symbolize gNB-controlled time/frequency resources indicated and/or configured by the gNB 20, 1020, 1020*a*, whereas the dashed regions collectively denoted with reference sign TFR-UE symbolize time/frequency resources autonomously allocated by at least one terminal device.

In some embodiments, in the time/frequency domain, the gNB 20, 1020, 1020*a* may e.g. indicate and/or configure resources, e.g. via broadcast information (e.g., MIB/SIB) and/or, for example dedicated, RRC and/or L1 and/or L2 signaling, e.g. as exemplarily described above. In some embodiments at least one terminal device, e.g. the exemplary first terminal device 10 of FIG. 2, may receive first information I-1 (FIG. 2) characterizing a resource configuration provided by a gNB 20, 1020, 1020*a* for a data exchange between a) the network device, e.g. gNB, and at least one terminal device and/or b) at least two terminal devices, and may e.g. provide, see for example block 302 of FIG. 1, second information I-2 based on the first information I-1 via at least one sidelink transmission SL-T (FIG. 2) to at least one further terminal device.

In some embodiments, frequency resources may e.g. be configured and/or indicated to at least one terminal device, e.g. UE, in a bandwidth part (BWP), where the terminal device is e.g. able to communicate on and/or configured to this BWP.

In some embodiments, at least one terminal device may e.g. be configured with one or more BWPs. In some embodiments, a BWP may be part or all of an overall system bandwidth, e.g. in a certain frequency band.

In some embodiments, e.g. when a gNB does not exist or is not active, at least one terminal device may be pre-configured, e.g. with one or more BWP, e.g. associated with at least one licensed frequency band and/or at least one unlicensed frequency band.

Figure 21:
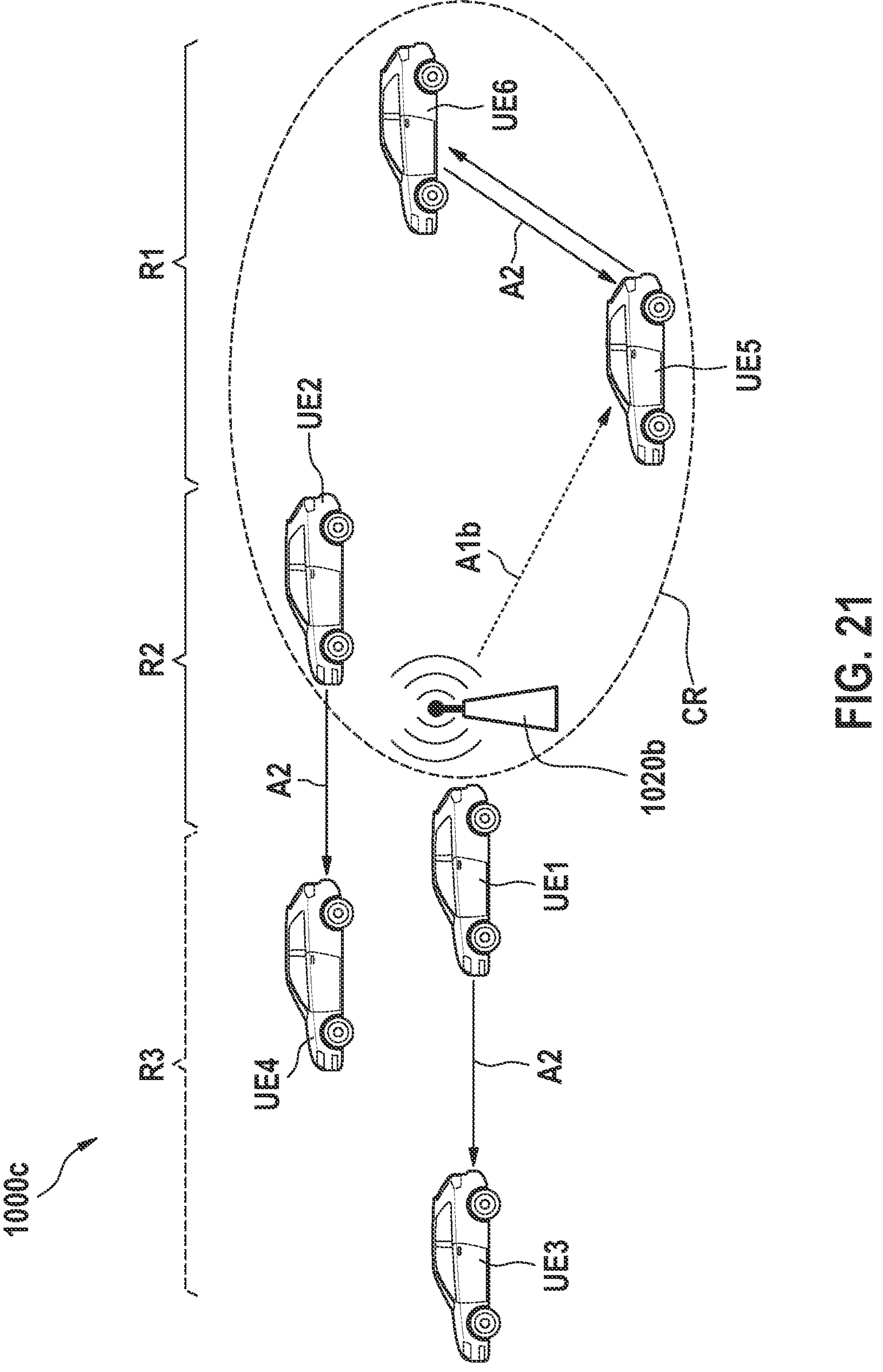
FIG. 21 schematically depicts a simplified block diagram according to exemplary embodiments of the present invention.

FIG. 21 schematically depicts a simplified block diagram according to further exemplary embodiments. Depicted is a further 5G NR compatible communication network 1000*c* with a gNB 1020*b* and a plurality of mobile terminal devices, exemplarily symbolized by cars UE1, UE2, UE3, UE4, UE5, UE6, wherein aspects of the principle according to the embodiments exemplarily disclosed above can also be used in the network 1000*c*. The terminal devices may at least temporarily be positioned within different regions R1, R2, R3, e.g. with respect to an exemplary radio coverage region CR of the gNB 1020*b*.

In some embodiments, connected mobility may gain focus, e.g. in different communication standards, e.g., the IEEE 802.11p/bd and 3GPP LTE/NR V2X//NR Uu and/or Sidelink. The latter is being developed further together with a cellular coverage. In an exemplary case of 3GPP LTE/NR V2X/NR Uu and/or Sidelink, in some embodiments, two situations may be considered, e.g. "in coverage", see for example region R1, and "out of coverage", see for example region R3. As an example, in the depicted scenario, the devices UE2, UE5, UE6 are within the coverage region CR of gNB 1020*b*, while the devices UE1, UE3, UE4 are outside the coverage region CR. Region R2 marks a region with potentially varying coverage.

In other words, in some embodiments, a part of the devices UE2, UE4 who are connected together, e.g. via sidelink, may be in-coverage, see UE2, while other ones, see e.g. UE4, may be out of the network coverage CR. In some embodiments, this may also be referred to as "partial out of coverage".

In some embodiments, e.g. when the, presently for exemplary purpose vehicular based, terminal devices UE1, UE2, . . . , UE6 are in coverage, e.g. within the coverage region CR of the gNB 1020*b*, the terminal devices can e.g. be configured to perform sidelink (e.g., direct) communication, e.g. inter-terminal device, e.g. inter-UE. In some embodiments, in this case, at least one of resource allocation, data control, and communication procedure may be controlled by the respective terminal device. However, if the respective terminal device is out-of-coverage of e.g. EUTRA or 5G-NR cells, e.g. outside the exemplary coverage region CR of FIG. 21, the respective terminal device may e.g. be pre-configured with an, e.g. mandatory, configuration, e.g. for autonomous communication, e.g. over the sidelink frequencies. In some embodiments, the terminal device may also be pre-configured with e.g. out-of-coverage frequencies, which, in some embodiments, may e.g. include intelligent transport system (ITS) frequencies, e.g. according to some accepted standard.

In some embodiments, e.g. for terminal devices to select their resources, some accepted standards such as e.g. 3GPP LTE/NR-V2X, propose two modes of operation and resource assignment:

- Mode 1: which is a network-controlled mode, where terminal devices are either dynamically granted with requested sidelink resources and/or are periodically configured with e.g. semi-persistent sidelink resources ("configured resources"),
- Mode 2: which is a mode allowing terminal devices e.g. to select their resources based on their need, e.g. from configured (and/or pre-configured) frequencies, e.g. with configured (and/or pre-configured) resource pools ("R-Pools").

While in some conventional approaches, it is clear that Mode 1 is e.g. only operable in case of in coverage, in some embodiments, Mode 2 can e.g. be configured during an in-coverage phase, where the base-station, e.g. gNB 1020*b* (FIG. 21) may e.g. configure appropriate frequencies/R-Pools, e.g. for an autonomous resource allocation.

In some embodiments, for example in all cases, when a terminal device is out-of-coverage, Mode 2 may e.g. be, for example natively, selected, and the terminal device may pick its own resources, e.g. from the pre-configured resources.

In some embodiments, in both resource allocation modes 1, 2, resources can be allocated either as:

- A one-shot transmission, where the terminal device e.g. sends only once, e.g. when it has a medium-access packet (or protocol, respectively) data-unit (MAC-PDU),
- configured sidelink resources, which may e.g. be, for example almost, periodic resources, e.g. allowing a terminal device to transmit e.g. multiple MAC-PDUs, e.g. on multiple transmission opportunities.

In some embodiments, e.g. for configured resources, a terminal device may e.g. be allocated with a, for example equal, amount of time/frequency resources, e.g. spaced in time, e.g. by a reservation period P_reserv. In some embodiments, e.g. in Mode 1, the base station, e.g. gNB 1020*b* (FIG. 21), may indicate to the terminal device UE5, e.g. via the Uu interface A1*b*, its configured grants, e.g. to be used according to the terminal device's needs. In some embodiments, e.g. in Mode 2, the terminal device may e.g. autonomously select a periodic configured resource, e.g. based on a, for example persistent, sensing. In some embodiments, the, for example persistent, sensing is also known, e.g. in a 3GPP context, as a semi-persistent scheduling (SPS) sensing.

In some embodiments, e.g. for the Uu interface, semi-persistent scheduling (SPS) may indicate resources e.g. scheduled by the gNB 1020*b*, e.g. for a Uu downlink (DL), and/or configured grants (CG) may indicate or characterize, respectively, resources configured by the gNB 1020*b*, e.g. for Uu Uplink (UL) transmission(s).

In some embodiments, CG may have two types, e.g. Type 1 and Type 2. In some embodiments, Type 1 is based on network configuration, e.g. via RRC configuration, where a terminal device is dictated at least one of a time offset, resources, periodicity and MCS (modulation and coding scheme). In some embodiments, Type 2 may be a mixture between RRC configuration (e.g., periodicity) and L1 signaling, e.g. DCI dictating enabling CG with a time offset and frequency resources.

In some exemplary embodiments, the principle according to the embodiments may e.g. be used together with at least one of the following aspects, which may, in some embodiments, be based on some accepted standard:

Group common Uu configuration/PDCCH (Physical Downlink Control Channel) (e.g., for channel access in unlicensed bands), Multicast adaption to RRC and DCI, Group handover for mobility management.

In some embodiments, as explained in detail further below, at least some of the following aspects and issues can at least temporarily be addressed and/or improved, e.g. as compared with some conventional approaches.

Aspect 1: Managing group communication for Uu and SL simultaneously

Some exemplary embodiments enable an efficient management of group communication, e.g. for Uu interface and for an SL interface, e.g. simultaneously.

In some embodiments, a terminal device 10, 10*a*, 10*b*, 10*c* (FIG. 2) may form part of a group, e.g. a managed SL group, G1, and such terminal device 10, 10*a*, 10*b*, 10*c* may e.g. at least temporarily utilize a coordination between the group members, e.g. to access the Uu interface, e.g. during an Idle state and/or an active state.

In some embodiments, accessing the Uu interface may e.g. be based on a group managed procedure.

In some embodiments, e.g. Uu-configured resources for SL may be managed, e.g. via the group G1, e.g. by the gNB 20 (FIG. 2), wherein, in some embodiments, the gNB 20 may e.g. know about the group managed SL communication SL-T or may, for example at least, consider group managed SL communication SL-T in its resource allocation.

Aspect 2: Access of group managed resources, e.g. in UL and/or DL, e.g. allocated by a, for example centralized, unit, e.g. including synchronization to a gNB 20. In some embodiments, a coordinated access e.g. to the Uu interface may be enabled, e.g. if a managed group G1 is formed. In some embodiments, a synchronization, e.g. of group managed resources, which is common between the members 10, 10*a*, 10*b*, 10*c* of the group G1 may be provided.

Aspect 3: In some embodiments, access to SL mode 1 resources may not be transparent for the managed SL-group G1. In some embodiments, SL Mode 1 resources may be considered as shared resources by the gNB 20, 1020, 1020*a*, 1020*b*, therefore, avoiding problems related to requests for resources from any other group member, e.g. elected to be a Group Head. In some embodiments, resource grant requests, e.g. SL Mode 1 resource grant requests, can not only be requested from a single, specific terminal device, e.g. for its own use, but can rather e.g. be managed (e.g., requested and/or extended) by at least one other terminal device of the group G1.

In the following, further exemplary aspects and embodiments are disclosed which, in further exemplary embodiments, can e.g. be combined with one or more of the exemplary aspects and/or embodiments explained above.

Figure 22:
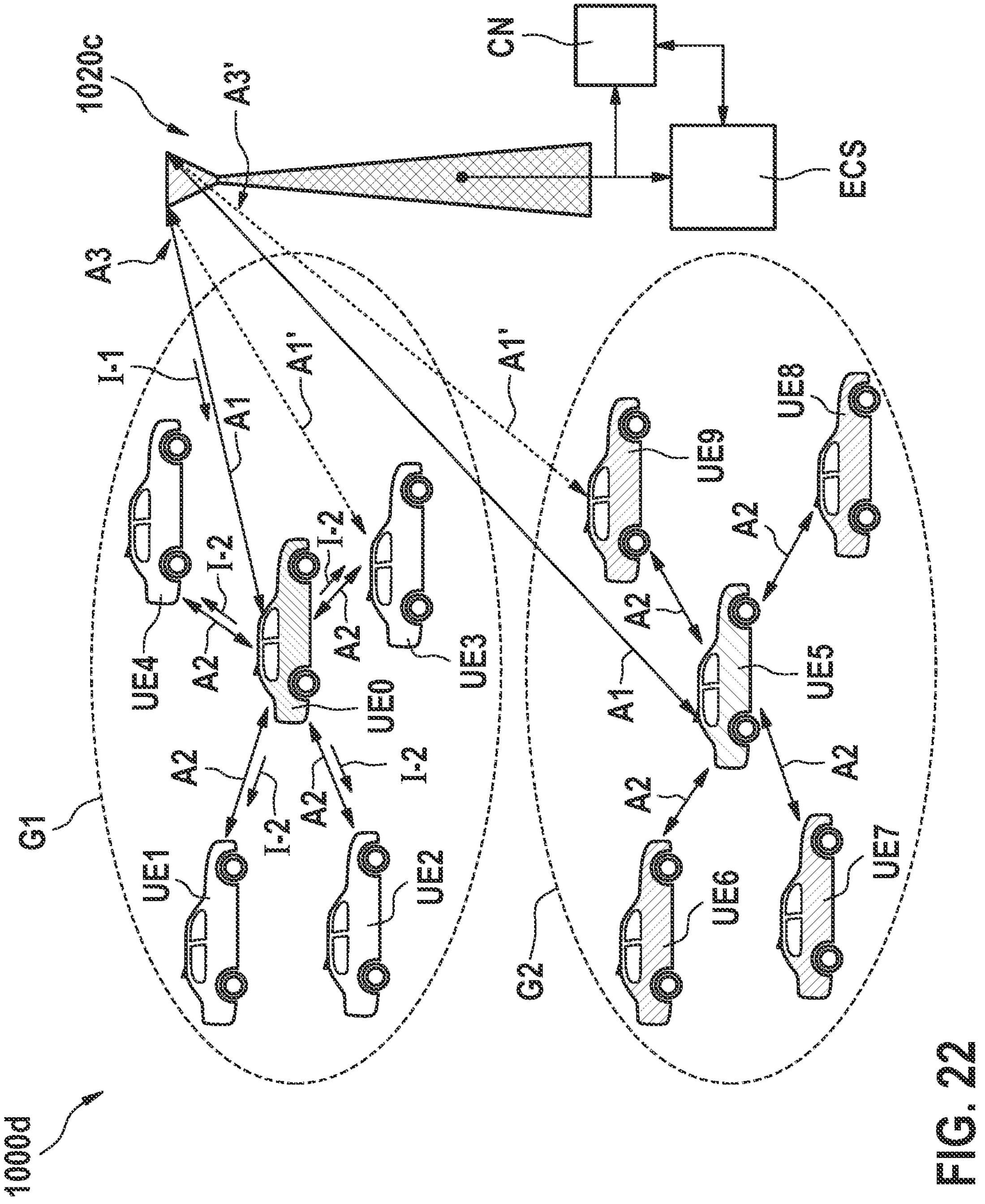
FIG. 22 schematically depicts a simplified block diagram according to exemplary embodiments of the present invention.

In some embodiments, see for example FIG. 22, the principle according to the embodiments may e.g. be used for vehicular networking, e.g. with terminal devices associated with one or more vehicles, as symbolized by reference signs UE0, UE1, . . . , UE4, UE5, . . . , UE9 in FIG. 22, wherein vehicular networking, in some embodiments, may at least temporarily provide at least one of the following benefits:

Improving safety: Using vehicular networks 1000*d* in some embodiments may enable the vehicles to exchange their status, their perception of the environment, and their future intention, exchanging such information may e.g. increase a safety on a road.

Traffic efficiency: The traffic characteristics, such as flow rate, vehicle density and vehicle speed, etc., can be used to improve the traffic efficiently. For these kinds of optimizations, in some embodiments, a global information of the traffic flow may be provided.

In some embodiments, e.g. for the safety relevant use-cases, a low latency and high reliability for information exchange e.g. within the network 1000*d* may be provided, whereas, in some embodiments, e.g. for traffic efficiency purposes, a high coverage may be provided.

In some embodiments, platooning may be used in combination with the principle according to the embodiments. As an example, two types of communication may be provided for the platooning: Between neighboring vehicles of a platoon, it may be beneficial to exchange information with a comparatively high rate and/or low latency and/or high reliability, because otherwise, in some cases, a string stability and/or safety of the platoon may not be guaranteed. For finding or merging of platoons, in some embodiments, the information may be sent with a comparatively low rate but e.g. over larger distances.

In some embodiments, a group start or group traveling may be performed, wherein a plurality of terminal devices may be associated with a specific group G1, G2, see for example FIG. 22. In some embodiments, a group G1 may be formed based on which terminal devices UE0, UE1, UE2, UE3, UE4 are collocated, e.g. in a certain vicinity range, i.e., communication range, e.g. for sidelink transmissions, or with a certain list, e.g. of potential group members.

In some embodiments a terminal device, e.g. when being a group member, may have or may be assigned at least one of a group list ID (identification), a groupcast ID (e.g., based on a group service ID or dedicated group cast ID), etc. In some embodiments, the group G1 may be connected to a cloud, e.g. via the network 1000*d*, e.g. the gNB 1020*c*, and, optionally, an edge server or cloud server ECS, which, in some embodiments, may be connected to a, for example 5G, core network CN, e.g. similar to the gNB 1020*c*, e.g. for delivering assisting information to a roadside unit (RSU).

In some embodiments, the terminal devices of the groups G1, G2 may exchange SL information, e.g. on respective group managed resources, whereby interference can be reduced or avoided.

In some embodiments, path selection and/or path switching (e.g., from SL to Uu or vice versa), e.g. during inactive time, may be enabled by the principle according to the embodiments.

In some embodiments, FIG. 22, SL-managed groups G1, G2 may at least temporarily be formed, which can e.g. improve accessing SL as well as accessing an Uu interface A1 (e.g., UL and/or DL), e.g. accelerating access to the Uu and/or SL interface(s) A2, thus e.g. providing faster access to Uu and/or SL interfaces than some conventional systems, even if some of the terminal devices of the groups G1, G2 are switched to inactive/Idle states.

In some embodiments, a group leader, e.g., terminal device UE0 for group G1 of FIG. 22, and/or an(other) terminal device which is currently active over the Uu interface, e.g. terminal device UE3, see arrow A1', can receive from the gNB 1020*c* resource configurations for SL transmissions and/or for Uu-based transmissions, e.g. for some, for example all, terminal devices UE0, . . . UE4 in its own group G1. Similar observations apply to the group lead terminal device UE5 of group G2.

In some embodiments, the receiving of resource configurations for SL transmissions and/or for Uu-based transmissions from the gNB 1020*c*, e.g. for some, for example all, terminal devices UE0, . . . UE4 of an own group may e.g. be performed according—or, in some embodiments, at least similar—to the exemplary embodiments explained above with respect to e.g. FIG. 1, 2, e.g. using the first information I-1 and the second information I-2, as explained above.

In some embodiments, FIG. 22, the arrows A3, A3' symbolize RRC and/or group common PDCCH (A3 for group G1, A3' for group G2), wherein the dashed arrows A1' symbolize alternative Uu connections e.g. to alternative group lead or active terminal devices UE4, UE9 of the respective groups G1, G2.

In some embodiments, regarding SL communication, an SL-group managed operation according to some embodiments enables terminal devices of a group G1, G2 to use resources (e.g. Uu and/or SL resources) autonomously, and, compared with some conventional approaches, e.g. in a coordinated manner, e.g. with a better management and efficiency, e.g. in a set of members, e.g. other terminal devices.

In some embodiments, the group members can e.g. choose their resources (autonomously or based on assisting information) from the SL-managed group resources, e.g. based on the second information I-2 (FIG. 2), e.g. in an managed, for example coordinated, fashion, e.g., where resources may also be split, e.g. into different orthogonal or quasi-orthogonal sets. which, in some embodiments, may have at least some of the following advantages:

a. Using managed SL resources for a comparatively small set of terminal devices, e.g. of one group G1 (e.g., a set of terminal devices requiring operation with functional safety ("FuSa")), e.g. with a group lead UE0, has the benefit that a possible interference can be handled easier as compared to some conventional approaches, e.g., via inter-terminal device coordination, e.g. with lower latency, which can e.g. be beneficial for safety messages.

b. Reduced inter-group interference, since in some embodiments, different resource pools can be assigned, e.g. by the gNB 1020*c*, e.g. to different, e.g. neighboring, groups G1, G2.

In some embodiments, the resources assigned to terminal devices UE0, . . . , UE4 of a same group G1 are not changed frequently, since the group members are e.g. moving together. As an example, a highway with three lanes is considered, wherein vehicular terminal devices associated with vehicles in each lane (e.g., with a given length along the lane) can form a respective group. Since at least in some embodiments, the terminal devices move, with their associated vehicles, in a similar direction determined by the respective lane, the group members are not changed often, and thus, frequent reassignment of resources can be avoided in some embodiments. As mentioned above, the gNB 1020*c* may assign different resource pools to different groups G1, G2, wherein, in the above-mentioned example of the highway, each lane may e.g. be associated a different resource pool.

In some embodiments, the gNB 1020*c* may configure a set of resources for either UL and/or DL ("group managed Uu resources"), wherein, as an example, any terminal device transitioning to an active Uu state (i.e., switching from either inactive or idle mode but e.g. pursuing SL to active Uu mode), which is a member of the group G1, may be able to access these group managed Uu resources (e.g., configured grants and/or SPS), e.g. in some embodiments even before the terminal device becomes fully registered as active or before the terminal device has received new grants, e.g. additional or extended grants, and/or before activation/deactivation of existing grants.

In some embodiments, an active terminal device UE0 (FIG. 22), e.g. similar to the first terminal device 10 of FIG. 2, may share Uu grant information, e.g. in the form of the second information I-2, with at least one further, for example all inactive and/or idle and/or active terminal devices UE1, UE2, UE3, UE4 in its SL-managed group G1.

In some embodiments, an inactive or idle terminal device may have access to existing Uu configured resources for the group G1 (as e.g. earlier provided from gNB 1020*c* to e.g. the group lead UE0, e.g. using the second information I-2), and in some embodiments, the availability of these resources for the group G1 may e.g. be shared with, for example all, members of the group G1, e.g. via inter-terminal device coordination information, e.g. via SL A2, also see the exemplary arrows I-2 along the arrows A2 of FIG. 22. Therefore, in some embodiments, accessing Uu resources may be fast and coordinated, even for terminal devices that have been inactive or idle for some time.

Using the principle of the embodiments enables to provide, in some embodiments, a unified methodology for accessing UL/DL in a coordinated (on a per-group basis), for example group-cast, manner, and SL-managed group resources. In some embodiments, a plurality of collocated or nearby terminal devices may form a managed group, which may also be referred to as "SL-managed group" in some embodiments.

Using the principle of the embodiments enables to provide, in some embodiments, see for example FIG. 22, a network architecture for communication networks 1000*d*, in which safety-critical information can e.g. be exchanged via short-range communication, e.g. using sidelink transmissions SL-T (FIG. 2), e.g. in a reliable fashion. In some embodiments, by doing this, channel traffic may be reduced and thus, a latency in the network 1000*d* can be decreased.

In some embodiments, group managed access in SL as well as Uu (e.g., simultaneously), can e.g. be utilized by one or more terminal devices of a network 1000*d*. In some embodiments, e.g. at the terminal devices, information, which might be helpful for the traffic efficiency and path switching, may be used, e.g. to reroute data between the two different interfaces: Uu, SL (e.g., using PC5). In some embodiments, data that should be sent with a lower rate or higher latency or much higher reliability may e.g. be sent via long-range communication, i.e., via Uu. In some embodiments, e.g. for low latency data, if resources are available, a terminal device may send the data via sidelink, i.e. PC5, e.g. on group managed resources. In some embodiments, e.g. as a fallback, if there is no group managed resources, the terminal device may use SL transmissions with group cast (e.g., without group managed resources according to some embodiments).

Some embodiments, FIG. 22, relate to group-managed Uu common resources for a group G1 of terminal devices. In some embodiments, Uu shared resources may e.g. be used for a fast UL/DL access for member terminal devices UE0, UE1, UE2, UE3, UE4 of a SL-managed group G1.

As an example, when a terminal device UE0 is active (e.g., in an RRC_CONNECTED state according to some accepted standard) and belongs to a SL managed-group G1, the terminal device UE0 (e.g., in some embodiments, only one terminal device at a time) is able to send UL data, e.g. using existing CG sent via the Network/gNB 1020*c* earlier, e.g. using the first information I-1 as also explained with reference to FIG. 2 above.

However, in some embodiments, if more than one terminal device UE0, UE3 gets active, the active terminal devices UE0, UE3 may e.g. share multiple parallel active configured grants (e.g., one terminal device access one CG (e.g., with a specific CG ID) at a time. Therefore, in some embodiments, a maximum number of terminal devices may be less than or equal to a number of active parallel CGs.

In some embodiments, another option is to share the information of the available resources of each configured resource(s) among the SL group-managed terminal device entities (terminal devices UE0, UE1, UE2, UE3, UE4, for example, for group G1) over sidelink A2, e.g. using inter-terminal device coordination information, i.e. in the form of the second information I-2 or derived from the second information I-2. In some embodiments, the second information I-2 may be used to allow sharing of Uu resources availability (e.g., if needed), e.g. for other inactive terminal devices, e.g. if, in future, they need to access the Uu channel quickly. Details related to the second information I-2 sent over sidelink A2 according to some embodiments is described further below.

In some embodiments, for example related to DL transmission resources, a multicast SPS may be considered which for example has a reference to a Multicast ID. In some embodiments, e.g. if one terminal device is active at a time, e.g. per SPS, the terminal device may send HARQ (hybrid automatic repeat request) feedback for the specific SPS ID. However, in some embodiments, e.g. if SPS is configured without HARQ feedback, more than one terminal device may simultaneously receive SPS.

In some embodiments, all (if more than one) active terminal devices can receive the SPS in DL; however, in some embodiments, it is proposed that, e.g. based on SL group-managed communication, only one of the more than one active terminal devices is responsible for sending HARQ ACK/NACK feedback.

In some embodiments, e.g. as an alternative, if more terminal devices are active and each terminal device receives a dedicated SPS, hence, each terminal device may report ACK/NACK to its specific SPS.

In the following, further exemplary aspects related to gNB configured Uu shared resources for SL-managed groups G1, G2 (FIG. 22) are disclosed.

In some embodiments, FIG. 22, the gNB 1020*c* shall configure Uu group common resources for UL to several, for example all, members of each group G1, G2 (e.g., for all terminal devices to be used by any terminal device for DL, and e.g. only by one terminal device at a time in UL).

In some embodiments, the group common Uu configuration/resources as e.g. characterized by the second information I-2 may e.g. be conveyed to/among inactive terminal devices via SL groupcast assisting information or, in some embodiments, PC5-RRC is transmitted between the active terminal device UE0 an all sleeping/inactive terminal devices UE1, UE2, UE3. UE4.

In some embodiments, storing the Uu configuration as e.g. characterized by the second information I-2 by the terminal device is proposed, e.g. once it switches from Active to inactive/Idle state. In some embodiments, the stored information may be overwritten by SL relayed "new/newer" information (e.g., taken from the current active terminal device that may e.g. have received more recent first information I-1 from the gNB 1020*c*).

In some embodiments, group common resources as e.g. characterized by the first information I-1 can e.g. be configured via a group common RRC (for multicast) or a group common PDCCH (for common DCI information), see for example the arrows A3, A3' of FIG. 22. In some embodiments, the group common configuration, e.g. grants, are either:—saved before transitioning to an Idle/inactive state or set via SL PC5-RRC signaling, or—configured for the active terminal device UE0 and relayed to all other terminal devices UE 1, . . . , UE4 via PC5-RRC information and/or SL assisting information.

In some embodiments, for UL, at least one active terminal device UE0 in the group G1 may receive an, e.g. RRC, configured grant (for example Type 1 or Type 2, as explained above), e.g. in the form of the first information I-1, and may forward, i.e. relay, this configuration to all other terminal device members in the group, e.g. as the second information I-2. In some embodiments, the UL GC (e.g., of Type 1 or 2) may be indicated as a group common UL in a group common RRC and/or PDCCH A3, A3', where the RRC e.g. includes a group cast ID (e.g., if configured).

In some embodiments, an active terminal device UE0 (e.g., if only one terminal device is active at a time) is allowed to send Uu UL, e.g. with critical (e.g. FuSa-related) information, e.g. either for its own services and/or on behalf of other terminal device(s) in the group G1.

In some embodiments, e.g. in case of DL, also a group common RRC and/or a group common PDCCH (DCI) with a common SPS or DL grants may be used.

In the following, exemplary aspects and embodiments are explained which relate to gNB Uu shared resources, e.g. for a SL-managed group, with a group-lead.

In some embodiments, FIG. 22, a group lead UE0 for an SL-managed group G1 may be transparent to the radio access network (RAN) including gNB 1020*c*. In other words, this means, that the group lead functionality taken by the group lead UE0 can be overtaken by any member in the group, wherein, for example, every member UE may be nominated, e.g. by the group, to connect to the network, e.g., functioning as a group-lead.

In some embodiments, the group lead UE0 may e.g. be announced to the group member terminal devices or to a part of the network (e.g. to an application cloud or edge, e.g. via the edge/cloud server ECS) to the non-access stratum (NAS).

In some embodiments, one assumption is that an elected group lead may be Uu active or may elect one (i.e., other) terminal device in its group G1 to be Uu active or knows (and manages) one terminal device in the group G1 that is active over Uu link. In some embodiments, the RAN/gNB 1020*c* is agnostic to this operation.

Hence, in some embodiments, it may be assumes that an SL-managed group G1 with members shall all be inactive/idle mode while maintaining their connectivity to a network 1000*d* via at least one active terminal device. For simplicity, and without losing generality, in some embodiments, the active terminal device may be the group lead terminal device UE0. In some other embodiments, the active terminal device may be another terminal device than the group lead UE0, e.g. a further terminal device UE3 of the same group G1.

In some embodiments, once a group lead UE0 is selected/elected, e.g. given that group lead is currently active, the terminal devices in the group G1 may e.g. switch to inactive (or idle). In some embodiments, e.g. in order to trigger the idle mode, the group lead UE0 may send either a group common assisting information (using L1 and/or L2 signaling), and/or or a group common PC5-RRC or a unicast PC5-RRC, e.g. for each terminal device in the group G1, e.g. including information about network acknowledgement for group common operation on Uu and/or SL, or that network resources are granted for Uu for the whole group members via group common Uu session(s). In some embodiments, such relayed information may represent the Uu control plane relayed information from the RAN/gNB 1020*c*.

In some embodiments, once the group lead terminal device UE0 (also see element GL of FIG. 2, for example) sends control-plane assisting information, e.g. using PC5-RRC, the other terminal device members the same group G1 may switch to inactive or idle mode.

Figure 23:
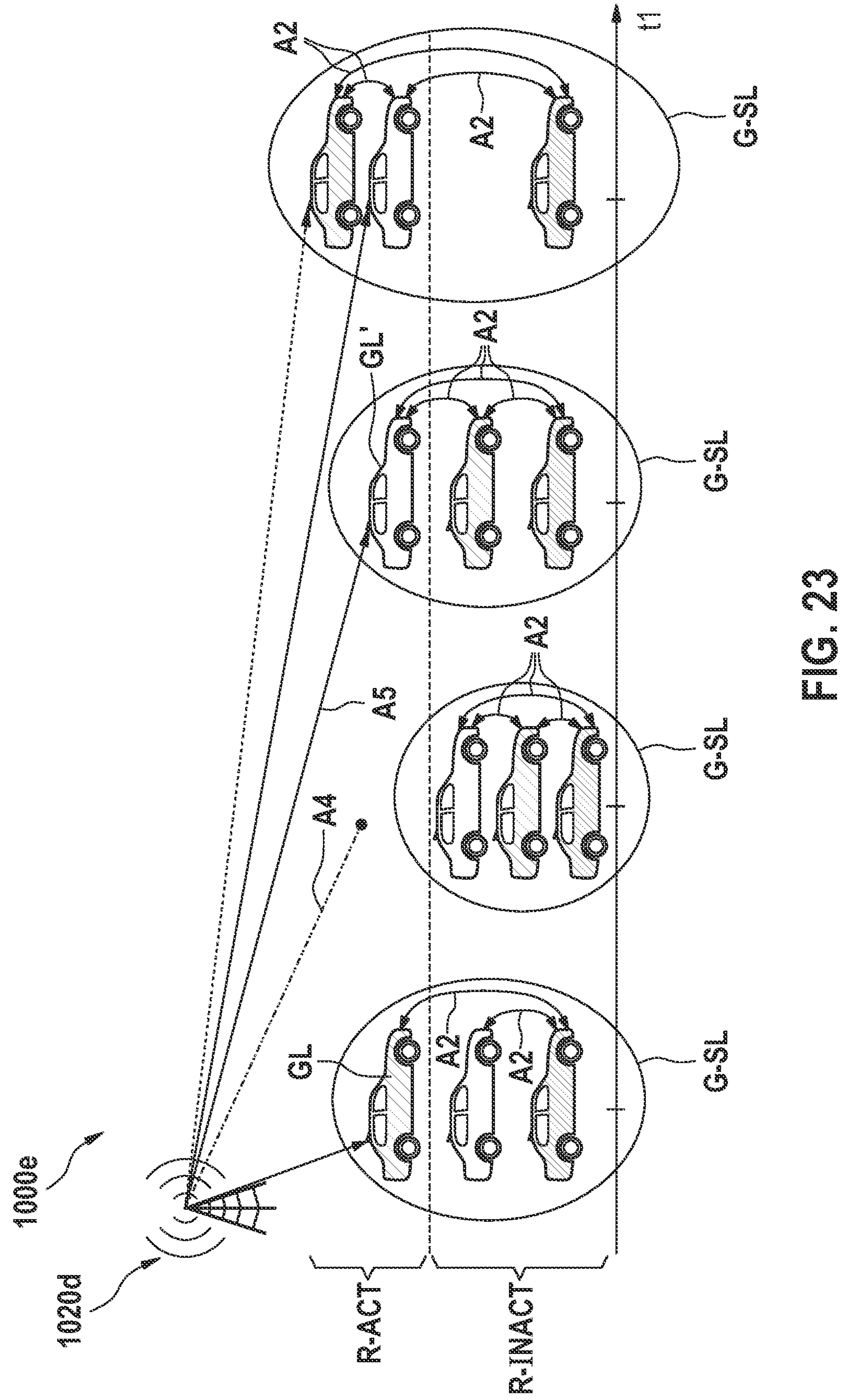
FIG. 23 schematically depicts a simplified block diagram according to exemplary embodiments of the present invention.

In the following, exemplary aspects and embodiments are explained which relate to gNB Uu shared resources for SL-managed groups G1, G2 (FIG. 22), e.g. when a group lead and/or an active terminal device disengages, see also the schematic diagram of FIG. 23 depicting a communication network 1000*e* having a gNB 1020*d* and a plurality of, e.g. vehicular, terminal devices represented by the symbolic vehicles of FIG. 23. The horizontal axis t1 represents a time axis, and vertically, two different regions R-ACT, R-INACT are distinguished, wherein region R-ACT comprises currently active terminal devices at a specific time, and wherein region R-INACT comprises currently inactive terminal devices at a specific time. Reference signs G-SL symbolize sidelink groups, reference signs A2 symbolize sidelinks between the different group members.

In some embodiments, once a group lead GL is disengaged, another group lead GL' is elected from the group G-SL, wherein, for example, the common resources for Uu shall not be changed.

Similarly, in some embodiments, if an active terminal device (which is not necessarily the group lead GL) switches to inactive/idle, a new member is elected or selected to switch to active and use existing group-common resources, e.g. until an active acquisition phase is completed (i.e., changing from inactive/idle status to active in the network).

In some embodiments, a new group member shall switch from idle to active, e.g. via a two-step RACH (Random Access Channel) procedure or a four-step RACH procedure, or from inactive to active status. In some embodiments, the new group member terminal device shall continue using the group common configuration/grants, i.e., without requesting new resources and/or without waiting for a complete RACH/re-activation procedure.

In some embodiments, it is also possible that a group lead GL, e.g. before it leaves the group G-SL, may inform group members and/or select a new member to communicate through Uu interface.

In some embodiments, further examples may be considered, e.g. when a group lead GL (or an active terminal device) is disengaging (or leaving the group G-SL), e.g. in case no other alternative group lead or member is ready, e.g. for Uu transmission engagement and (e.g., additionally, if needed) to switch, e.g. transition, to active mode. In some embodiments, in such cases, one or more of the configured resources for UL and/or DL may be skipped, see for example dashed arrow A4 of FIG. 23 symbolizing a skipped grant. In this case, the gNB 1020*d* may e.g. detect the skipped grant(s) A4 and may e.g. request re-transmission (or send re-transmission), e.g. based on a HARQ process ID.

Arrow A5 of FIG. 23 symbolizes an exemplary CG for ID0, and dashed arrow A5' symbolizes an exemplary CG for ID1, both as e.g. signaled earlier by the gNB 1020*d*, e.g. using the first information I-1 (not shown in FIG. 23).

In some embodiments, the exemplary configuration of FIG. 23 and the exemplary aspects and embodiments explained above with respect to FIG. 23 may also be applied to Uu DL SPS configurations.

In the following, exemplary aspects and embodiments which relate to a group lead-managed idle mode handover for terminal device-members of a group G-SL are explained with reference to FIG. 24. An exemplary communication network 1000*f* comprises for example two gNBs 1020*e*1, 1020*e*2, wherein the gNB 1020*e*1 is associated with a source radio cell, S-Cell, serving the terminal devices of the group G-SL in a first phase PH1 of a path evolution as characterized by the horizontal axis PE.

In some embodiments, in case of handover, group managed resources over Uu and SL as e.g. earlier notified by the source gNB 1020*e*1, see arrow A6, may be handled during the handover, see the phase PH2. In some embodiments, e.g. a conditional handover (CHO) is conveyed by serving gNB 1020*e*1 to an active terminal device UE0 in the group G-SL. In some embodiments, when the group G-SL receives handover conditions, e.g. the group lead or the active terminal device UE0 may perform measurements associated with the handover and may e.g. check for neighboring cells (e.g., for selecting a target cell (T-Cell) provided by target gNB 1020*e*2).

In some embodiments, the source cell (S-Cell) or the source gNB 1020*e*1, respectively, may direct control plane information, configured resources, and group acknowledge information to the T-Cell or the target gNB 1020*e*2, respectively. In some embodiments, the T-Cell or target gNB 1020*e*2, respectively, in a third phase PH3, e.g. after the handover PH2, may instruct the currently active terminal device UE1 (which is not necessarily the same terminal device UE0 that was active in the S-Cell in phase PH1) about a new configuration and/or re-configuration, see the arrow A7.

In some embodiments, and for example similar to some of the above explained embodiments, new configuration and/or updated configuration (i.e., including cell specific information, e.g., MIB and SIB) may be conveyed (e.g., relayed) via SL inter-terminal device coordinated information between 10 the active terminal device(s) UE1 (e.g., receiving Uu actively from T-Cell gNB 1020*e*2) to inactive/idle terminal device members, see for example the arrows A2.

In some embodiments, non-identical resources, e.g. resource sets, e.g. comprising time and/or frequency resources, may be used for the information exchanges A2, A6. As an example, first resources or a first resource set, respectively, used for the information exchange A6 between the gNB 1020*e*1 and the group G-SL, e.g. vehicle UE0, may comprise first time resources and first frequency resources, wherein second resources or a second resource set, respectively, used for the information exchange A2 within the group G-SL, may comprise second time resources and second frequency resources. In some embodiments, at least one of the following variants is proposed:

a) the first time resources are different from the second time resources, and the first frequency resources are different from the second frequency resources,
b) the first time resources are at least partly overlapping with or are identical to the second time resources, and the first frequency resources are different from the second frequency resources,
c) the first time resources are different from the second time resources, the first frequency resources are at least partly overlapping with or are identical to the second frequency resources.

In some embodiments, during a handover interruption in the phase PH2, an active terminal device can assume there is a skipped grant. As an example, in some embodiments, a UE or group of UE may be allowed to skip a configured grant in general (not use it for a while, e.g. characterized by a timer).

In this case, in some examples, if one of the allocated configured grants was not successful because the UE is not in the coverage of a gNB, this can be marked, e.g. in the end, e.g. as a skipped grant and not a complete configured grant interruption. In this case, in some embodiments, the UE can either delay the skipped one or drop it, e.g. if it is not very important or can be replaced by other data (i.e., depending on the QoS). In some embodiments, e.g. after successful HO, the UE may resume transmission in new grants, e.g. starting from the one marked grant to be postponed or the following one.

In some embodiments, the active terminal device may, e.g. after successful group-managed handover is performed, see phase PH3, re-transmit failed UL packets, and/or the T-Cell gNB 1020*e*2 may e.g. also transmit the failed DL packets.

To summarize, in some embodiments, an SL-group managed handover with, e.g. seamless, group access for re-configured Uu and SL resources, is enabled by the principle according to the embodiments.

In some embodiments, a group managed handover may e.g. relate for SL-group managed SL and Uu access, for example only.

In the following, exemplary aspects and embodiments which relate to Uu and SL path selection/switching from group managed access, e.g. considering path selection and/or path-switching based on safety aspects are disclosed.

Figure 24:
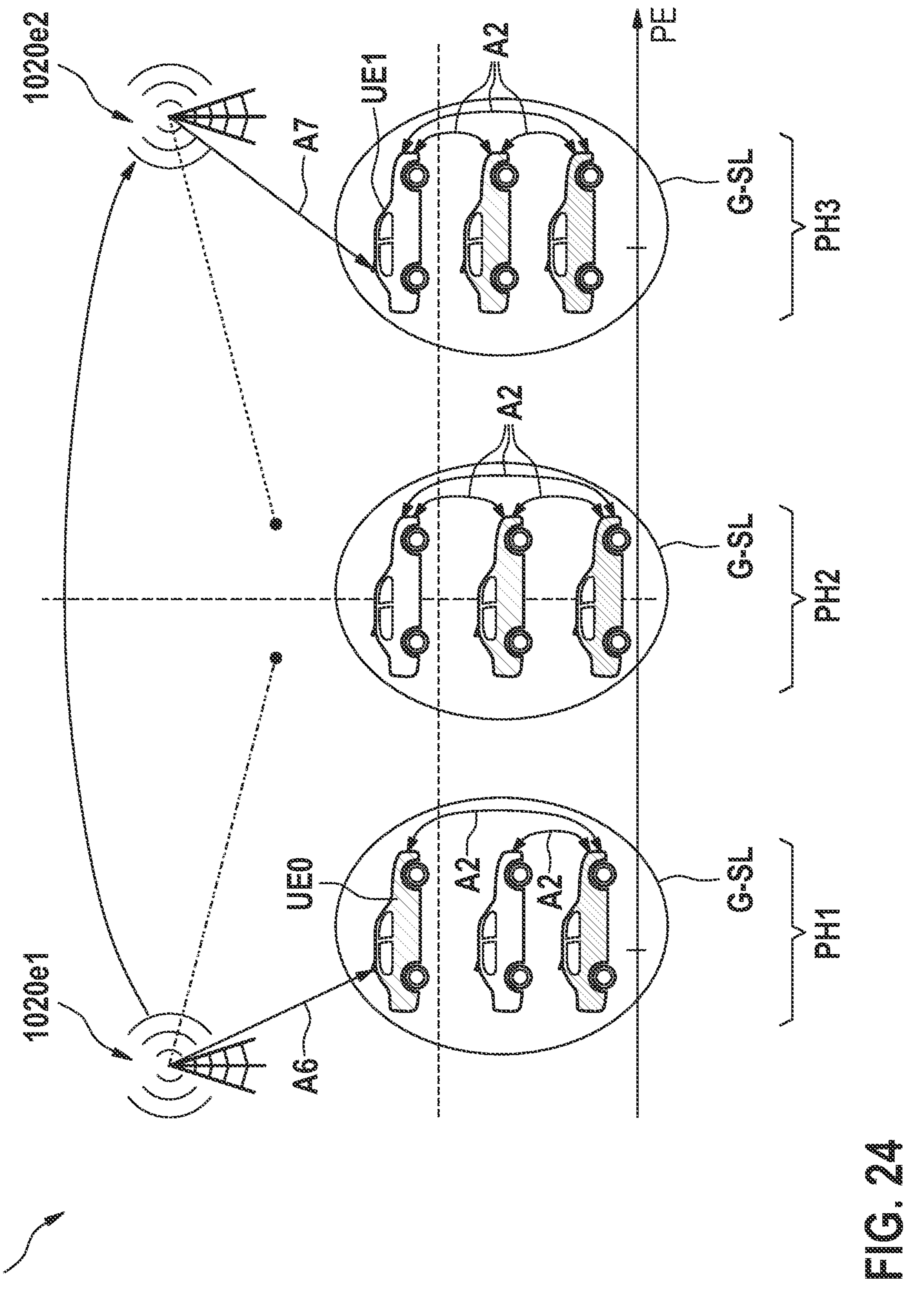
FIG. 24 schematically depicts a simplified block diagram according to exemplary embodiments of the present invention.

In some embodiments, FIG. 24, e.g. for V2X communication, a terminal device UE0 in a Sidelink-managed group GR-SL may switch to inactive/idle mode, see for example the transition from phase PH1 to phases PH2, PH3. However, in some embodiments it may be requested, e.g. by the network 1000*f*, to be in attentive Sidelink Mode. Therefore, in some embodiments, e.g. for functional safety (FuSa) communication, the terminal device may not change to RRC_CONNECTED mode, e.g. if the terminal device has a data originated from a V2X service. However, in some embodiments, the terminal device shall rather communicate over Sidelink A2 first. In some embodiments, in this case, the terminal devices in the group GR-SL may e.g. switch to idle mode/inactive mode over Uu; however, in some embodiments, as mentioned above, the SL A2 is still active and e.g. selected for FuSa-related communication. Hence, in some embodiments, other group members exchange their, for example "local", safety relevant messages via short range communication, e.g. SL A2, and e.g. network-based safety relevant messages may be sent via group lead/active terminal device(s) UE0 (phase PH1) over Uu links. Also, in some embodiments, an active terminal device UE0 may gather information from at least some, e.g. all, inactive/idle terminal devices, e.g. over sidelink A2, and send the relevant information (e.g., relay the relevant data plane) to the network 1000*f*, e.g. via the group-common Uu resources.

In some embodiments, e.g. for path selection and/or switching, it is proposed that a header (e.g., L2 header) includes an identifier, e.g. in a container or data field (e.g., a MAC container in some embodiments), that identifies whether a message is to be kept for local SL transmission, e.g., when transmitted by a group member (e.g., in an active terminal device) over sidelink and sent to another active terminal device (e.g., a terminal device active on the Uu interface, e.g., a group lead).

In some embodiments, a sidelink message may have a container and/or identifier, e.g. indicating that the message is to be relayed to the network, e.g. via the Uu interface, which in some embodiments may e.g. be applicable to network-based safety related information. In some embodiments, in case of network-based safety related information, e.g. when the SL message is received by an active terminal device or an active group lead, the active terminal device may select to relay the received SL message to the network 1000*f*.

In some embodiments, e.g. if the active terminal device UE0 is receiving multiple messages to be relayed to the network 1000*f*, only correctly received message are gathered, e.g. assembled or aggregated, and sent to the network 1000*f*. In some embodiments, redundancies related to multiple received SL messages may e.g. be filtered by the active terminal device UE0, e.g., at a PDCP (packet data convergence protocol) layer.

In some embodiments, message can be received over SL, which is e.g. to be transmitted or re-transmitted on both SL A2 and relayed to the network, e.g. via the Uu interface. In this case, in some embodiments, at least some, for example all, members of the group GF-SL may relay the message, and one or more active member(s) of the group G-SL may send it, e.g. via both interfaces (Uu and SL).

In some embodiments, possible values for the at least one indicator IND-I-5 explained above with reference to FIG. 11, which may e.g. indicate whether a) a received SL message, e.g. the message MSG-I-5 as exemplarily depicted by FIG. 11, relates to a local safety, e.g. a safety associated with the group G1, and/or whether b) the message MSG-I-5 relates to a network safety, e.g. a safety associated with the network 1000 may e.g. be provided based on the following Table 1, which exemplarily depicts in a first, e.g. left, column, possible values for a data field in a data, e.g. MAC header, container of an SL message. In the second, i.e. middle, column, Table 1 indicates, using Boolean values, whether an SL message according to some embodiments is related to a local safety, and in the third, i.e. right, column, Table 1 indicates, using Boolean values, whether the SL message is related to a network safety.

TABLE 1

Safety related to local and/or network filter for path-switching

| Field in the data/ MAC header container | Field value Local-Safety | Field value network-related safety |
|---|---|---|
| Value{1} | True | False |
| Value{2} | False | True |
| Value{3} | True | True |
| Value{4} | False | False |

In some embodiments, the information associated with the middle column and the right column may e.g. be characterized using two bit. In other words, the possible values Value{1}, Value{2}, Value{3}, Value{4} may, in some embodiments, e.g. be binary encoded using e.g. two bit, e.g. corresponding to binary values "10", "01", "11", "00".

In the following, exemplary aspects which relate to group-managed SL common resources, e.g. Sidelink shared resources for a SL-managed group, according to further exemplary embodiments are disclosed.

In some embodiments, based on a position and/or other characteristics of terminal devices, different groups of terminal devices, e.g. vehicular terminal devices, may be created, see for example the groups G1, G2 of FIG. 22. In some embodiments, groups can e.g. be compiled and/or associated with a member-ID list and/or based on their associated communication range and/or, e.g., their distance, e.g. from a reference terminal device in the group.

In some embodiments, the terminal devices UE0, UE1, UE2, UE3, UE4 or their associated vehicles in the same group G1 move together while their distance does not exceed a predetermined threshold of e.g. hundreds of meters. In some embodiments, a distance can be controlled by a communication range, which may e.g. be used to convey sidelink communication or may, in some embodiments, be used for sidelink communication procedure, e.g., power control, HARQ, group cast, etc.

In some embodiments, for selecting a communication range, functional safety may be leveraged, e.g., in some embodiments, FuSa high integrity levels can be associated with smaller communication range than, for example, non FuSa-related integrity levels.

In what follows, a resource-efficient approach for implementing a heterogeneous vehicular network according to some exemplary embodiments is disclosed. In some embodiments, SL communication in a managed group G1, G2 (FIG. 22) is considered, wherein each group G1, G2 may have at least one terminal device UE 0, UE5, which is and/or at least temporarily acts as a leader of group ("group lead").

In some embodiments, FIG. 22, the terminal devices in a SL-managed group may e.g. perform a path selection (e.g. Uu interface A1 versus SL interface A2), e.g. for V2X application (and/or other types of) messages, wherein, in one example, at least some, for example all, vehicles or associated terminal devices, respectively, exchange safety related information contained in, e.g., at least one CAM (Cooperative Awareness Message) and/or CPM (Collective Perception Message), etc., e.g. according to some accepted standard. In some embodiments, such CAM and/or CPM (and/or other type of) message may e.g. be sent via a short range communication (e.g., the sidelink interface A2), e.g. if sidelink resources, e.g. an SL channel, is/are available. In some embodiments, such messages, e.g. functional safety-related messages, may be transmitted over sidelink, e.g. considering a certain (e.g., configured or given) communication range. In some embodiments, messages such as FuSa-related messages are e.g. sent in a groupcast fashion, e.g. protected, e.g. by a HARQ mechanism, e.g. requiring ACK or NACK feedback.

In some embodiments, safety critical messages or less critical messages (e.g., quality management messages) can be routed or re-routed to Uu group managed resources, as exemplarily proposed earlier.

In some embodiments, as also exemplarily described before, at least one terminal device (e.g., the group lead) UE0 (FIG. 22) may be in an active mode (over Uu interface A1), while some, for example all, other terminal devices are e.g. in an inactive/idle mode. In some embodiments, e.g. if FuSa messages indicate or, for example require, a network path selection over Uu interface A1 (e.g., not over the SL interface A2), the active terminal device UE0 (e.g., group lead) may e.g. relay such FuSa message(s), e.g. to the Uu interface A1. In some embodiments, e.g. if there is no active terminal device UE0 at the moment, any elected/selected terminal device in the group may use an existing resource configuration, e.g. to relay FuSa messages, e.g. on behalf of the group G1 or on behalf of itself (i.e., if the safety information is, e.g., related to group safety).

In some embodiments, at least some of the following aspects may be considered for SL shared resources for Mode 1 and/or Mode 2 (e.g., according to some accepted standard such as e.g. 3GPP LTE/NR-V2X):

- How SL resources are configured by the gNB 1020*c* to the group G1, e.g. to only the active terminal device (e.g., group lead), e.g. including Mode 1 configured grants (e.g., Type 1 or Type 2), or terminal device selected resource Mode 2. Note that in some embodiments, an ITS band may be assumed to be out of the control of the gNB 1020*c* and may e.g. be used inside the group G1, e.g. based on Mode 2 (e.g., sensing based sidelink, for example, only),
- SL available information may e.g. be shared via a group lead GL, UE0, and may e.g. be dictated to other group members, e.g. via the SL interface A2.

In some embodiments, a Mode 1-type CG may e.g. be announced by the gNB 1020*c*, e.g. to a single active group member (e.g., the active terminal device UE0 or the group lead, if it is active (and different from the terminal device UE0)), and/or via a Uu groupcast and/or multicast RRC and/or PDCCH common resources (e.g., for more than one active terminal device at a time).

In some embodiments, Mode 1-type CG configuration(s) may e.g. be relayed via the SL A2, e.g. to at least some, for example all, other terminal device members in the group G1, e.g., via PC5-RRC signaling and/or via PSCCH/SCI, and/or MAC control element (CE) over sidelink, etc.

In some embodiments, for example alternatively, e.g. when more terminal devices are active at the same time, the active terminal devices may e.g. receive a group common RRC Uu configuration as a Uu groupcast/multicast RRC signaling.

In the following, exemplary aspects which relate to SL inter-terminal device coordination information, e.g. about resource availability, according to further exemplary embodiments are disclosed.

In some embodiments, at least some of the following aspects and embodiments may e.g. be considered in relation to Uu resources, e.g. resources for communication with the gNB 1020*c* over the Uu interface A1.

In some embodiments, FIG. 22, the information related e.g. to Uu resources, e.g. in the form of the second information I-2, see for example also FIG. 1, 2, shared between terminal devices may comprise at least one of the following:

a) Available number of active (and still available) Uu configured grants or free reserved resources, b) In a configured grant, a period may e.g. be divided into shares, e.g., if a 10 ms CG/SPS period is reserved for e.g. five group common terminal devices over UL, an exemplary share according to some embodiments can e.g. be managed, e.g. by the group lead terminal device UE0 (FIG. 22) as follows: ○ 100 ms, 30 ms, 70 ms, 90 ms periods (or any combination that does not have collisions), o In some embodiments, it may e.g. be up to the group lead terminal device to design the split and share it among Uu active terminal device(s), e.g., if there is more than one Uu active terminal device at a time.

c) In some embodiments, at least some, for example all, terminal devices, mark on this coordinated information, e.g. the second information I-2, which CGs ID it uses, e.g. for how long, and/or configured grants reserved periods, thus e.g. updating the second information I-2, see for example block 405 of FIG. 13.

In relation to Table 2 presented further below, according to some embodiments, it is proposed that all or at least a part of the configuration from the gNB 1020*c* (FIG. 22), e.g. as characterized by at least one of the first information I-1 and the second information I-2, may be transferred to all or at least some, e.g. at least to the active, terminal devices, and/or to a group lead UE0.

In other words, in some embodiments, Table 2 may characterize aspects of SL Inter-terminal device coordination that may e.g. be sent to group members, e.g. indicating Uu resource availability, e.g. shared by a group lead and/or by an (other) active terminal device.

In some embodiments, at least some of the following exemplary options may be considered relating to information as can e.g. be characterized by and/or comprised within Table 2:

Option 1: the second information I-2, which may e.g. be characterized by at least a portion (e.g., CG configuration) of the exemplary Table 2 presented further below may be relayed, e.g. by the active terminal device UE0 (which has received the second information I-2 and/or the first information I-1 and may e.g. have derived the second information I-2 based on the received first information I-1) to some terminal devices, e.g. to every terminal device that wants to be active, or to a group lead, e.g. in cases the group lead comprises information on which terminal device wants to be active (such information on which terminal device wants to be active may, in some embodiments, e.g. be exchanged, e.g. earlier, e.g. via SL A2, and/or may be configured, e.g. preconfigured). In other words, in some embodiments, an activity requirement or an activity indication may e.g. be, for example directly, shared in the group G1, e.g. with the current active terminal device UE0.

Option 2: the second information I-2, which may e.g. be characterized by at least a portion (e.g., CG configuration) of the exemplary Table 2 presented further below may be relayed, e.g. by the active terminal device UE0 (which has received the second information I-2 and/or the first information I-1 and may e.g. have derived the second information I-2 based on the received first information I-1), e.g. to a group lead terminal device, where the group lead terminal device may e.g. send the second information I-2 (or at least a portion thereof), e.g. as a groupcast, e.g. to all members of the group G1. In some embodiments, the transmission of the second information, e.g. characterizing values of the exemplary Table 2, can be effected using at least one message which may e.g. be protected, e.g. by HARQ feedback. Herewith, in some embodiments, the group lead may assume that all members of its group G1 have received the second information I-2 or the (contents of the) Table 2 correctly. In some embodiments, e.g. only active, terminal devices send, e.g. their respective, update(s) (e.g., indicating newly occupied resources by respective active terminal device, e.g. based on the received second information I-2) to the second information I-2, e.g. as characterized by the Table 2, e.g. at least similar to block 407 of FIG. 13. In some embodiments, it may e.g. be up to every terminal device how to update the second information I-2, e.g. the Table 2. However, in some other embodiments, it may also be configured and/or standardized whether and/or how a terminal device should update the second information I-2, e.g. the Table 2. In some embodiments, e.g. the group lead may send, e.g. repeatedly, for example periodically, signaling to indicate a current status, e.g. related to the second information I-2 and/or the Table 2, e.g. at least one of RRC signaling and an L2 reconfiguration message. In some embodiments, it may be up to the group member terminal devices to overwrite their (own) updated Table 2 and/or to compare it, e.g. with the second information I-2 as e.g. received from the group lead.

TABLE 2

| Field number | Available configured resource type | Total configured resource | Configured resources T/F information | DCI/RRC update | Occupied configured resources | Remaining configured resources |
|---|---|---|---|---|---|---|
| 1 | CG Type 1 | 4 | CG-1{1}: time-offset, periodicity, frequency, etc.<br>CG-1{2}: time-offset, periodicity, frequency, etc.<br>CG-1{3}: time-offset, periodicity, frequency, etc.<br>CG-1{4}: time-offset, periodicity, frequency, etc. | No | 2: CG-1{1, 2} | 2: CG-1{3, 4} |
| 2 | CG Type 2 | 4 | CG-2{1}: time-offset, periodicity, frequency, etc.<br>CG-2{2}: time-offset, periodicity, frequency, etc.<br>CG-2{3}: time-offset, periodicity, | Yes, DCI: values | 2: CG-2{1, 2} | 2: CG-2{3, 4} |

TABLE 2-continued

| Field number | Available configured resource type | Total configured resource | Configured resources T/F information | DCI/RRC update | Occupied configured resources | Remaining configured resources |
|---|---|---|---|---|---|---|
| | | | frequency, etc. CG-2{4}: time-offset, periodicity, frequency, etc. | | | |
| 3 | SPS | 8 | SPS{1}: time-offset, periodicity, frequency, etc. . . . SPS{2}: time-offset, periodicity, frequency, etc. | Yes, DCI | Irrelevant | 8 |
| 4 | . . . | | | | | |
| . . . | . . . | | | | | |

As can be seen from Table 2, which in some embodiments may e.g. be considered as an exemplary form of organizing at least some aspects of the second information I-2 according to the embodiments, the Table 2 may e.g. comprise at least one of: a) a first column indicating a field number, b) a second column indicating an available configured resource type, c) a third column indicating a number of total configured resources, d) a fourth column indicating configured resources, e.g. comprising information related to time and/or frequency resources associated with the configured resources, such as e.g. at least one of: a time offset, a periodicity, a frequency, and the like, e) a fifth column indicating whether an update is made, and, if so, e.g. details related to the update, f) a sixth column indicating (e.g., already) occupied configured resources (e.g., based on feedback or updated second information as e.g. received from other terminal devices), g) a seventh column indicating remaining configured resources.

In some embodiments, the Table 2 and/or the second information I-2 may comprise only a portion of the aforementioned exemplarily disclosed seven columns, and/or additional information (not shown).

In some embodiments, at least some of the following aspects and embodiments may e.g. be considered in relation to SL resources, e.g. resources for communication of a terminal device with other terminal devices, e.g. of a same group G1 (FIG. 22), e.g. over the SL interface(s) A2. In this context, Table 3 presented further below exemplarily indicates aspects of SL Inter-terminal device coordination information which may e.g. be sent to other group members, e.g. indicating Uu resource availability (e.g., shared by GL or an active terminal device).

In some embodiments, see for example FIG. 22, e.g. if SL resources are configured by the network 1000*d* and/or the gNB 1020*c*, an SL resource management may e.g. be similar to a procedure exemplarily described above for Uu interface-related resources above, e.g. with respect to Table 2, also see Table 3 presented further below.

In some embodiments, SL resources may be configured as either "configured resources" or "dynamic resources", wherein e.g. configured resources can be CG Type 1 resources for SL, e.g. using an Uu RRC configuration, or CG Type 2 resources, e.g. using RRC configuration plus, for example, L1 signaling-based activation and/or deactivation. In some embodiments, e.g. for configured SL resources, an active terminal device UE0 may relay the configured resources to a group lead (e.g., similar to what is exemplarily depicted by Table 3 further below, e.g. with SL-CG Type 1/2, for example, only). In some embodiments, the relaying of the configured resources to the group lead may e.g. be done via a unicast transmission. In some embodiments, a groupcast of the configured resources, e.g. to all group members (e.g., informing the group G1 about the total available resources), may also be performed.

In some embodiments, the active terminal UE0 may wait, e.g. after relaying or after the groupcast of the configured resources, e.g. for the group lead or, in some embodiments, any terminal device (e.g. a terminal in charge), e.g. to send inter-terminal device assisting information about the usage of SL resources, e.g. in form of or at least similar to the updated second information I-2', see for example also the blocks 405, 407 of FIG. 13.

In some embodiments, however, for example if the active terminal device UE0 (FIG. 22) is considering the group lead role, then, the active terminal device UE0 may e.g. not, for example blindly, relay the configured resources (e.g., similar to exemplary Table 3 provided below e.g. for SL CG) to other member(s). Instead, in some embodiments, the group lead terminal device may perform a resource selection and may e.g. send the selected or recommended resources, e.g. to individual members of the group G1 or groupcast at least some resources, e.g. to many member terminal devices. In some embodiments, in the latter situation, the group lead may e.g. request at least some of the other terminal devices to share some resources, e.g. to perform sensing.

In some embodiments, e.g. if the SL resources are from dedicated SL bands (e.g., ITS bands, unlicensed bands, etc.), the group lead and/or active terminal device may e.g. relay, for example only, Uu configured resources as e.g. exemplarily disclosed above, and may schedule and/or select at least some of the SL resources, e.g. for sensing.

TABLE 3

| Field number | Available SL configured resource type | Total configured resource | Configured resources T/F Information | DCI/RRC update | Occupied configured resources | Remaining configured resources |
|---|---|---|---|---|---|---|
| 1 | SL- CG Type 1 | N | SL- CG-1{1}: time-offset, periodicity, frequency, etc. . . . | No | 2: SL-CG-1{1, 2} | 2: SL-CG-1{3, 4} |
| 2 | SL- CG Type 2 | M | SL- CG-2{1}: time-offset, periodicity, frequency, etc. . . . | Yes, DCI, values | 2: SL-CG-2{1, 2} | 2: SL-CG-2{3, 4} |

As can be seen from Table 3, which in some embodiments may e.g. be considered as an exemplary form of organizing at least some aspects of the second information I-2 according to the embodiments (and which, in some embodiments may also, for example at least temporarily and/or at least partly, be combined with at least some aspects of exemplary Table 2 explained above), the Table 3 may e.g. comprise at least one of: a) a first column indicating a field number, b) a second column indicating an available configured resource type for SL, c) a third column indicating a number of total configured resources, d) a fourth column indicating configured resources, e.g. comprising information related to time and/or frequency resources associated with the configured SL resources, such as e.g. at least one of: a time offset, a periodicity, a frequency, and the like, e) a fifth column indicating whether an update is (or may be) made, e.g. via RRC signaling and/or via DCI, and, if so, e.g. details related to the update, f) a sixth column indicating (e.g., already) occupied configured SL resources (e.g., based on feedback or updated second information as e.g. received from other terminal devices), g) a seventh column indicating remaining configured SL resources.

In some embodiments, the Table 3 and/or the second information I-2 may comprise only a portion of the aforementioned exemplarily disclosed seven columns, and/or additional information (not shown).

In some embodiments, at least some aspects of Table 2 and/or Table 3 may also be combined, e.g. to form at least a part of the second information I-2 and/or of the updated second information I-2' according to some exemplary embodiments.

Figure 25:
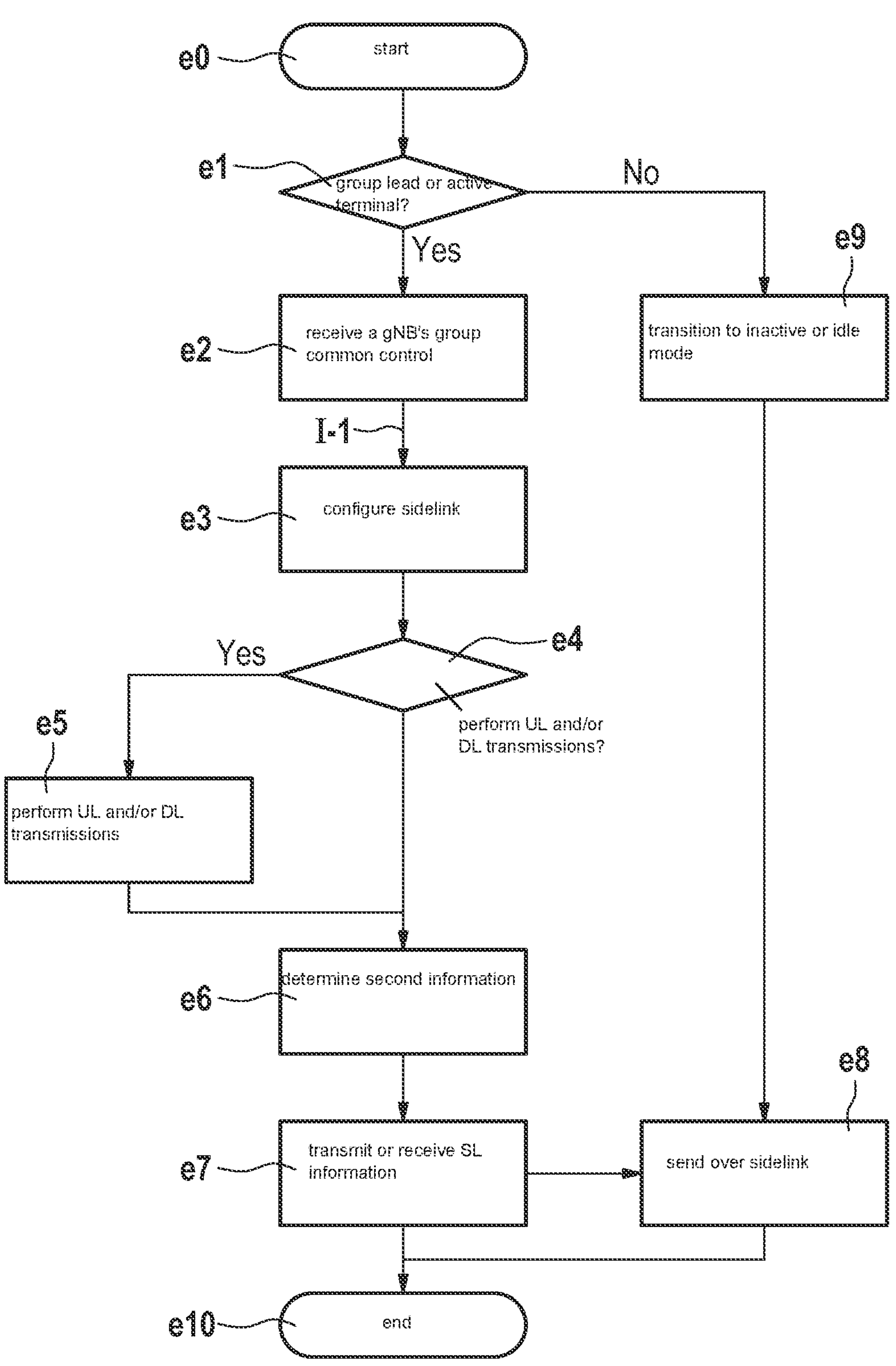
FIG. 25 schematically depicts a simplified flow-chart according to exemplary embodiments of the present invention.

FIG. 25 schematically depicts a simplified flow-chart according to exemplary embodiments, related to Uu communication for SL-group managed terminal devices. Element e0 symbolizes a start of the procedure, which may, in some embodiments, e.g. be carried out by a terminal device 10, 10*a*, 10*b*, . . . , see for example FIG. 2.

Element e1 symbolizes determining whether the terminal device is a group lead or an active terminal device (e.g., active with respect to information exchange over the Uu interface A1, see for example arrow A1 of FIG. 22). If so, e.g. if the determination e1 yields that the terminal device is the group lead or an active terminal device, the procedures continues with block e2, which symbolizes receiving a gNB's group common control (e.g., via RRC signaling and/or PDCCH), e.g. comprising the first information I-1, e.g. characterizing at least one of Uu CG, SPS (e.g., one or multiple). Element e3 symbolizes configuring a sidelink SL, element e4 symbolizes whether to perform UL and/or DL transmissions, e.g. over the Uu interface, and, if so, performing the UL and/or DL transmissions, see block e5. Otherwise, or after block e5, the procedure continues with block e6, symbolizing a generation or preparation, e.g. determination of the second information I-2, based on the first information I-1, e.g. comprising at least some aspects of table 2. Element e7 symbolizes transmission or receipt of SL information, e.g. inter-terminal device assistance information, element e8 symbolizes sending over sidelink, element e9 symbolizes transitioning to an inactive or idle mode, e.g. if the determination e1 yields that the terminal device is neither the group lead nor an active terminal device, and element e10 symbolizes an end of the exemplary procedure according to FIG. 25.

Figure 26:
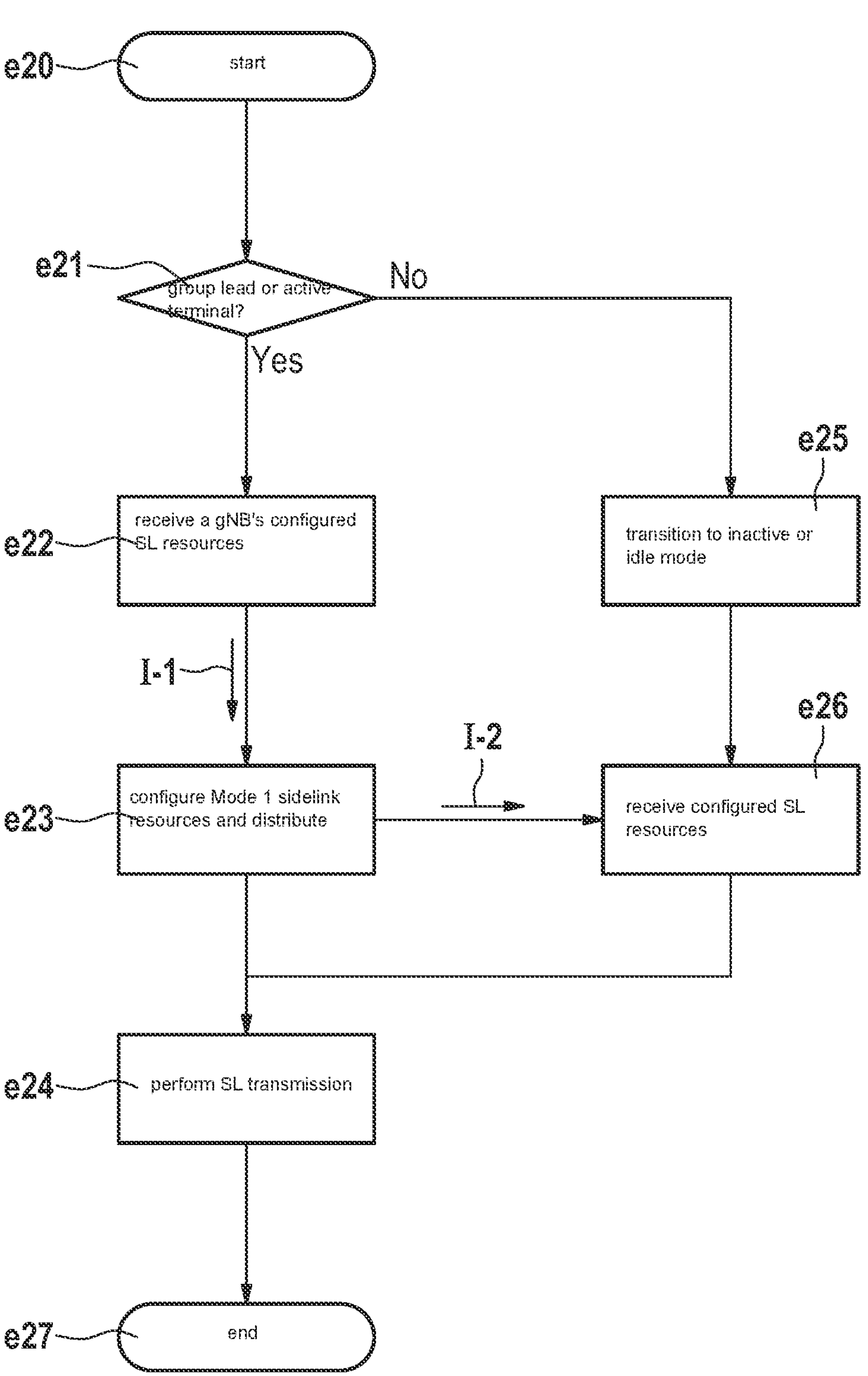
FIG. 26 schematically depicts a simplified flow-chart according to exemplary embodiments of the present invention.

FIG. 26 schematically depicts a simplified flow-chart according to exemplary embodiments, related to Mode 1 configuration for SL-group managed terminal devices, e.g. for V2X applications. Element e20 symbolizes a start of the procedure, which may, in some embodiments, e.g. be carried out by a terminal device 10, 10*a*, 10*b*, . . . , see for example FIG. 2.

Element e21 symbolizes determining whether the terminal device is a group lead or an active terminal device (e.g., active with respect to information exchange over the Uu interface A1, see for example arrow A1 of FIG. 22). If so, e.g. if the determination e21 yields that the terminal device is the group lead or an active terminal device, the procedures continues with block e22, which symbolizes receiving a gNB's configured SL resources, e.g. associated with Mode 1 as explained above, e.g. comprising the first information I-1. Element e23 symbolizes configuring Mode 1 sidelink resources and distributing the configured Mode 1 sidelink resources, e.g. to other terminal devices of a respective group, and element e24 symbolizes performing a SL transmission.

Element e25 symbolizes transitioning to an inactive or idle mode, e.g. if the determination e21 yields that the terminal device is neither the group lead nor an active terminal device, and element e26 symbolizes receiving of configured SL resources, e.g. from an active and/or group lead terminal device. Element e27 symbolizes an end of the exemplary procedure according to FIG. 26.

In some embodiments, e.g. related to the exemplary procedure explained above with reference to FIG. 26, terminal devices in the respective group may e.g. use Mode 1 resources either as instructed (e.g., assisted) by the active/group lead terminal device, see e.g. blocks e23, e26, and/or based on sensing, e.g. over Mode 1 terminal devices.

Figure 27:
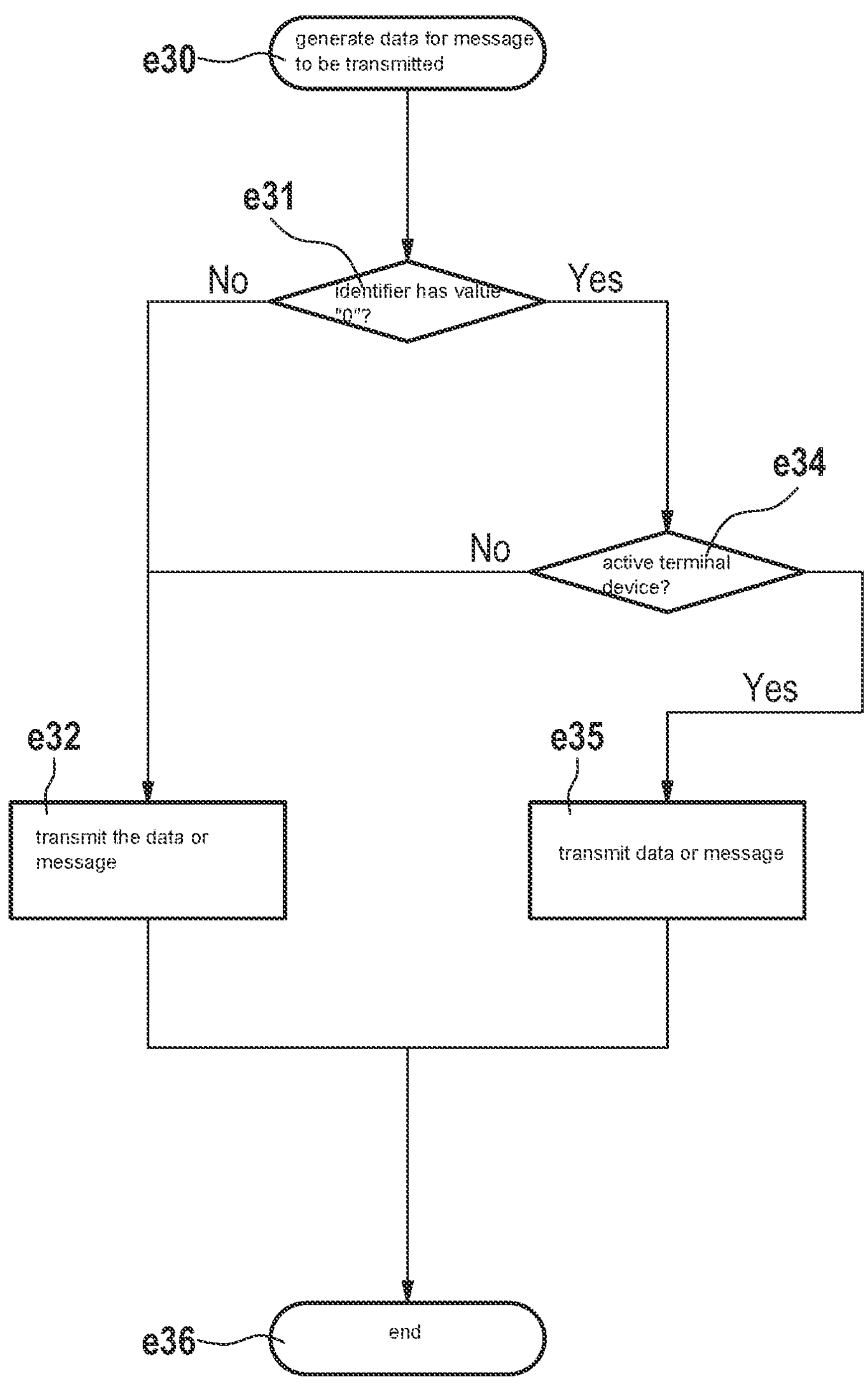
FIG. 27 schematically depicts a simplified flow-chart according to exemplary embodiments of the present invention.

FIG. 27 exemplarily depicts a simplified flow-chart according to some embodiments, related to path switching. Element e30 symbolizes a generation of data, e.g. for a message to be transmitted in the network 1000 (FIG. 2), wherein the message may e.g. comprise an identifier, e.g. one bit, indicating, for example, with a value of "0" that the message is related to the network 1000, and with a value of "1" that the message is related to a sidelink. In some embodiments, the identifier for the message may e.g. be at least similar to the exemplary information explained above with reference to Table 1. Element e31 symbolizes determining whether the identifier has the value "0", and if not, the procedure continues with element e32 symbolizing transmitting the data or message, respectively, via a configured sidelink, whereas if the identifier has the value "0", the procedure continues with element e34, symbolizing determining whether the acting terminal device is an active (i.e., active with respect to the Uu interface) terminal device, and, if so, the procedure continues with element e35, symbolizing transmitting the data or message, respectively, via a configured Uu resource, e.g. to a gNB 20. In some embodiments, if the determining e34 whether the acting terminal device is an active (i.e., active with respect to the Uu interface) terminal device, yields that the acting terminal is not an active (i.e., active with respect to the Uu interface) terminal device, the procedure continues with element e32, e.g. SL transmission, as explained above. Element e36 symbolizes an end of the exemplary procedure according to FIG. 27.

In some embodiments, the exemplary procedure of FIG. 27 may e.g. be used for terminal devices to identify safety message(s), e.g. based on the identifier, and to choose an appropriate path for transmission of the related data/message either via SL (element e32) or via Uu interface (element e35). In some embodiments, the identifier may e.g. be provided in a header (e.g., MAC Control Element).

In the following, further exemplary embodiments and aspects are provided which, in further embodiments, may e.g. be combined with one or more aspects and/or embodiments exemplarily disclosed above.

In some embodiments, the principle according to the embodiments enables to provide, e.g. guarantee, a unified methodology for accessing UL/DL, e.g. in a groupcast manner (but, for example coordinated), and e.g. SL-managed group resources.

Regarding use of a Uu interface, in some embodiments, a terminal device which e.g. switches to an active state may use the pre-configured Uu resources, which were relayed over SL. In other words, e.g. if the terminal device is switching from idle/inactive to active, the terminal device may use these configured resources, e.g. until an activation is completed. In some embodiments, an activation of a terminal device is not provided, for example required, for group specific, e.g. SL-based, communication.

Regarding use of a SL interface, SL resources may e.g. be configured by a gNB and may be relayed from the network to the terminal devices, e.g. of a group G1 (FIG. 2), e.g. via an active terminal device ("terminal device-to-network relay"). In some embodiments, an (optional) group lead GL (FIG. 2) may manage and/or distribute resources. In some embodiments, the resources can e.g. be Mode 1 (where they may e.g. be shared with sensing in the group or precisely allocated, e.g. by a group lead). In some embodiments, Mode 2 is also possible, e.g. for shared, e.g. sensing based, resources.

Regarding information relayed over SL, in some embodiments, safety information, e.g. being associated with or represented by data with a container including a field representing transmission in the group (local) or to the network (e.g., via the active terminal device, terminal device-to-network relay), e.g. as characterized by Table 1. In some embodiments, e.g. based on an identifier, an active terminal device is enabled to perform SL/Uu path switching. In some embodiments, other terminal devices may e.g. be relayed, e.g. similar to or like SL synchronization, e.g. using S-SSB (Sidelink-Synchronization Signal Block).

In some embodiments, Uu configured resources may e.g. be relayed by an active terminal device (e.g., terminal device-to-Network relay) to group members, e.g. via RRC messages, e.g., using SL unicast, or Layer 2 signaling, e.g., using groupcast, e.g. as exemplarily characterized by Table 2.

In some embodiments, SL configured resources may e.g. be relayed by an active terminal device (e.g., terminal device-to-Network relay) to group members, e.g. via RRC messages, e.g., using SL unicast, or Layer 2 signaling, e.g., using group cast, e.g. as exemplarily characterized by Table 3.

Figure 28:
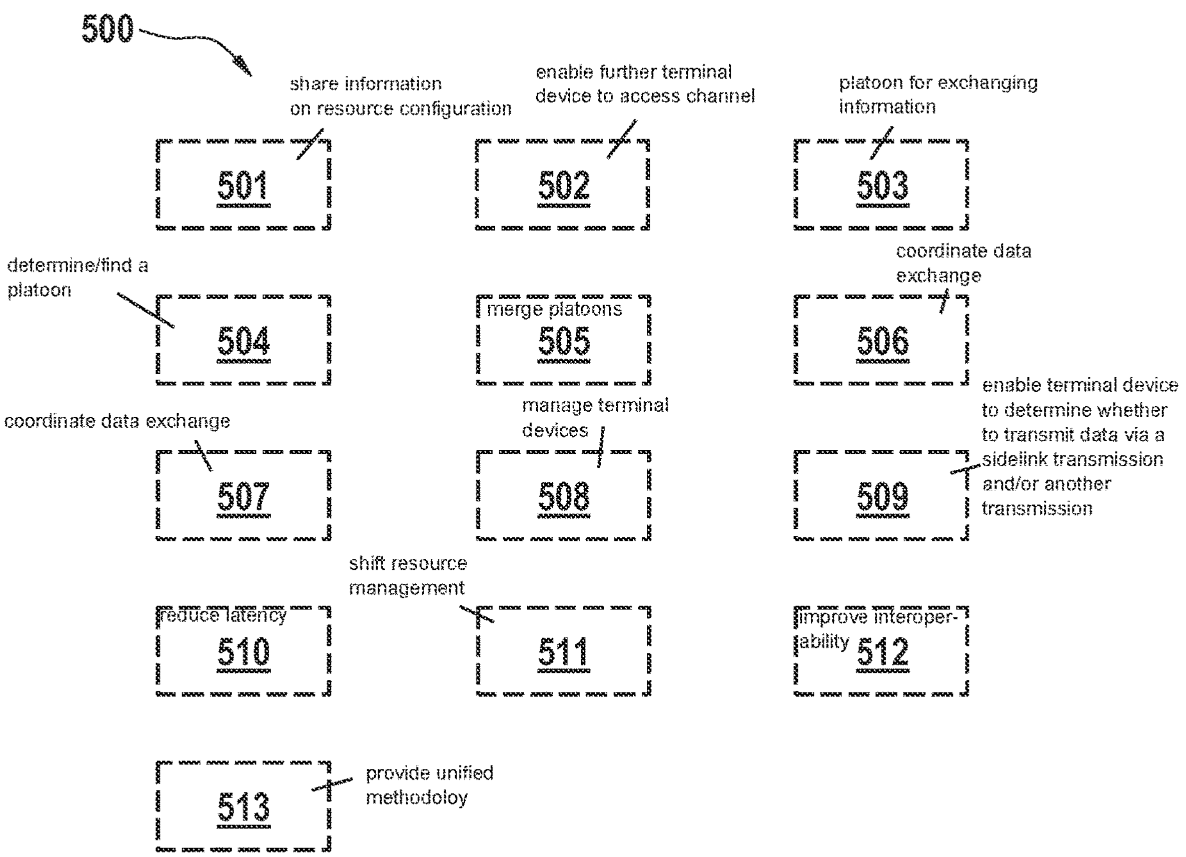
FIG. 28 schematically depicts aspects of use according to exemplary embodiments of the present invention.

Further exemplary embodiments, FIG. 28, relate to a use 500 of the method according to the embodiments and/or of the apparatus 100, 100*a*, 200 according to the embodiments and/or of the communication system 1000 according to the embodiments and/or of the computer program PRG, PRG' according to the embodiments and/or of the computer-readable storage medium SM according to the embodiments and/or of the data carrier signal DCS according to the embodiments for at least one of: a) sharing 501 information on the resource configuration provided by the network device with at least one further terminal device, b) enabling 502 at least one further terminal device to, for example quickly, access a channel, for example Uu channel, for transmitting data to the network device, c) platooning 503, for example for exchanging information between terminal devices associated with a platoon, d) determining, e.g. finding, 504 a platoon of several terminal devices, e) merging 505 of platoons, e.g. combining terminal devices associated with a plurality of first platoons to form a second platoon, f) coordinating 506 a data exchange between terminal devices, e.g. of a group of terminal devices, and the network device, g) coordinating 507 a data exchange between different terminal devices, e.g. of a group of terminal devices, h) managing 508 a plurality of terminal devices, for example related to h1) a usage of resources for inter-terminal device communication, for example via a sidelink transmission, and/or related to h2) a usage of resources for an uplink information exchange with the network device, and/or related to h3) a usage of resources for a downlink information exchange with the network device, i) enabling 509 at least one terminal device to determine whether to transmit data via a sidelink transmission and/or via another transmission which is different from a sidelink transmission, wherein the determination may for example be based on at least one of: a, for example required, latency, a service availability, a reliability, j) reducing 510 latency in a communications system, k) shifting 511 resource management at least temporarily and/or at least partly from the network device to at least one terminal device, l) improving 512 an interoperability of sidelink data transmissions and uplink data transmissions and/or downlink data transmissions, m) providing 513 a unified methodology for accessing uplink data transmissions and/or downlink data transmissions, for example in a, for example coordinated, group-cast manner, for example by at least one terminal device.

In some embodiments, at least one of the following aspects may be provided based on the principle according to the embodiments: a) a, for example novel, protocol/procedure for managed groupcast communication for SL and Uu jointly, b) a, for example novel, group common signaling for managed group cast communication, c) a, for example novel, procedure to access Uu configured grants and SPS, d) a, for example novel, fast access after idle/inactive, e.g. with or without RACH (e.g., from idle), e) a, for example novel, procedure to access Mode 1 SL grants via inactive Uu but active SL terminal devices, f) a, for example novel, procedure for groupcast sync to the active terminal device as a Sync source, g) a, for example novel, procedure to relay group-common signaling and broadcast signaling (e.g., MIB, SIB, SIBx, etc.), h) assisting better synchronization of the group-common S-BSS, i) assisting Uu access from inactive/Idle to short active, j) assisting seamless path selection, e.g. for FuSa, (e.g., may be decided by the terminal device to go over SL or Uu).

In some embodiments, at least one of the following aspects and advantages may at least temporarily be attained based on the principle according to the embodiments: a) A short-range based communication is multicast or broadcast and thus, much more resource efficient than a unicast long-range communication, b) making a terminal device able to select which path according to required latency, service availability, reliability, etc., c) channel traffic in short range is reduced due to the low power transmission between a group managed SL, e.g. re-utilizing Mode 1 resources for the group member, e.g. re-utilizing common Uu resources, e.g. without grant-request and efficient path selection. Thus, the latency in the network can be decreased. d) The role of a group lead can be extended even to lower layers. In some embodiments, the group lead can manage a resource allocation, e.g. for the short-range (e.g., SL) communication. e) A computation in a server may be more efficient and simpler, it may e.g. guarantee that there is always persistent link to any/all terminal devices in the group managed set, f) It enables the interoperability of short range and long range.

What is claimed is:

1. A computer-implemented method for a network via which a first terminal device and at least one further terminal device communicate, the method comprising the following steps:

receiving, by the first terminal device and from a base station of the network, first information identifying a grant of a resource block usable for data exchanges on the network, the resource block defining a bounded set of communication resources in at least one of a time domain or a frequency domain that is granted to the first terminal device for division and assignment;

dividing, by the first terminal device and based on the first information, the resource block into a plurality of resource subblocks; and configuring, by the first terminal device, respective ones of the at least one further terminal device with respective ones of the resource subblocks, wherein:

the configuring includes:

assigning the respective ones of the resource subblocks to the respective ones of the at least one further terminal device; and providing, and via at least one sidelink, respective second information to the respective ones of the at least one further terminal device;

the respective second information is determined by the first terminal device based on the first information; and for each of the respective ones of the at least one further terminal device, the respective second information identifies a respective one of the resource subblocks that:

(i) is a strict subset of the bounded set of communication resources defined by the resource block, the strict subset resulting from the division of the resource block performed by the first terminal device; and (ii) is assigned as an allocated portion to the respective further terminal device such that, from the bounded set of communication resources of the resource block, the respective further terminal device is authorized to perform data exchanges using only communication resources included in one or more of the resource subblocks assigned to the respective further terminal device by the first terminal device.

2. The method according to claim 1, wherein the first information includes at least one of: a) configured grant information associated with at least one uplink data transmission to the base station, b) resource information associated with semi-persistent scheduling, c) dynamic grant associated with time and/or frequency resources, d) configured grant information associated with at least one sidelink data transmission.

3. The method according to claim 1, wherein the one or more of the at least one further terminal device to which the second information is provided via the at least one sidelink transmission is composed of a predetermined further terminal device group.

4. The method according to claim 1, wherein:

the resource block defines a period granted for communication in the time domain;

the dividing includes dividing, by the first terminal device, the period into a plurality of time shares; and for at least a subset of the time shares, the assigning includes assignment of each of the time shares of the at least the subset to a respective one of the one or more of the at least one further terminal device.

5. The method according to claim 1, further comprising:

forming, by the first terminal device, together with the one or more of the at least one further terminal device, a group of sidelink transmission-based, group-managed, terminal devices capable of exchanging data with each other using sidelink transmissions.

6. The method according to claim 5, wherein the first terminal device at least temporarily assumes a role of a group-lead of the group and being connected to a network.

7. The method according to claim 5, wherein the providing of the second information to the one or more of the at least one further terminal device includes providing the second information to a group-lead terminal device of the group, wherein the group-lead terminal device is configured to transmit the second information, using group-cast transmissions, to all other members of the group, or, using unicast to at least some other member of the group.

8. The method according to claim 1, wherein a hybrid automatic repeat request, HARQ, mechanism is used for providing protection to a transmission of the second information to the one or more of the at least one further terminal device.

9. The method according to claim 1, further comprising:

synchronizing, by the first terminal device, timing of use of the resource slots assigned to the one or more of the at least one further terminal device, which form a group of a sidelink transmission-based, group-managed, terminal devices capable of exchanging data with each other using sidelink transmissions.

10. The method according to claim 5, wherein the group includes terminal devices which are at least temporarily collocated or nearby each other.

11. The method according to claim 5, further comprising:

a) indicating, by the first terminal device, a group-lead of the group to: i) at least one of the terminal devices of the group, and/or ii) a network device including a cloud device and/or an edge device;

b) maintaining, by the first terminal device, a connectivity of terminal devices belonging to the group to the base station; and/or c) maintaining the first terminal device in an active state.

12. The method according to claim 6, further comprising:

a) notifying members of the group that the first terminal device intends to leave the group; and/or b) determining a new group lead which is designated to perform a data exchange with the base station for at least one member of the group.

13. The method according to claim 1, further comprising:

receiving, by the first terminal device, third information from at least one member of a group of sidelink transmission-based, group-managed, terminal devices capable of exchanging data with each other using sidelink transmissions, the third information characterizing a message and at least one indicator indicating whether a) the message relates to a local safety associated with the group, and/or b) the message relates to a safety associated with the network;

based on the at least one indicator, providing at least the message to: i) a further terminal device of the group, and/or ii) the network device.

14. The method according to claim 13, further comprising:

processing the third information including: a) determining whether multiple potentially redundant messages are associated with the third information, b) filtering at least a part of the third information, and/or c) aggregating at least a part of the third information.

15. The method according to claim 1, wherein the method is used for:

a) enabling the one or more of the at least one further terminal device to access a channel for transmitting data to the network device, b) exchanging information between terminal devices associated with a platoon, c) determining or finding a platoon of several terminal devices, d) merging of platoons including combining terminal devices associated with a plurality of first platoons to form a second platoon, e) coordinating a data exchange between a group of terminal devices and the network device, f) coordinating a data exchange between different terminal devices of a group of terminal devices, g) managing a plurality of terminal devices related to i) a usage of resources for inter-terminal device communication via a sidelink transmission, and/or ii) a usage of resources for an uplink information exchange with the network device, and/or iii) a usage of resources for a downlink information exchange with the network device, h) enabling at least one terminal device to determine whether to transmit data via a sidelink transmission and/or via another transmission which is different from a sidelink transmission, wherein the determination is based on at least one of: a required latency, a service availability, a reliability, i) reducing latency in a communications system, j) shifting resource management at least temporarily and/or at least partly from the network device to at least one terminal device, k) improving an interoperability of sidelink data transmissions, and uplink data transmissions and/or downlink data transmissions, and/or l) Providing a unified methodology for accessing uplink data transmissions and/or downlink data transmissions in a coordinated, group-cast manner, by at least one terminal device.

16. A computer-implemented method comprising:

receiving, by a first terminal device and from the network device:

first information characterizing a resource configuration for a data exchange between a) the network device and at least one terminal device of a group of sidelink transmission-based, group-managed terminal devices that are capable of exchanging data with one another using sidelink transmissions and/or b) at least two terminal devices of the group; and second information characterizing handover conditions for a conditional handover (CHO) procedure; and transmitting (a) third information based on the first information via at least one sidelink transmission and (b) at least a part of the second information, the transmitting of the third information and the at least the part of the second information being to one or more terminal devices of the group, the one or more terminal devices to which the third information is transmitted being the same as or different from the one or more terminal devices to which the at least the part of the second information is transmitted.

17. The method according to claim 16, further comprising:

receiving, by the first terminal device, fourth information characterizing a configuration or reconfiguration associated with the CHO; and transmitting at least a part of the fourth information to the group of sidelink transmission-based, group-managed, terminal devices capable of exchanging data with each other using sidelink transmissions.

18. A computer-implemented method for a network via which a plurality of terminal devices communicate, the method comprising the following steps:

receiving, by a second terminal device, respective second information from a first terminal device via at least one sidelink transmission, wherein:

the respective second information is determined by the first terminal device based on first information provided by a base station of the network to the first terminal device, the first information identifying a grant of a resource block usable for data exchanges on the network, the resource block defining a bounded set of communication resources in at least one of a time domain or a frequency domain that is granted to the first terminal device for division and assignment; and the respective second information identifies one or more resource subblocks that:

(i) are strict subsets of the bounded set of communication resources defined by the resource block, the strict subsets resulting from a division of the resource block performed by the first terminal device; and (ii) are assigned as allocated portions to the second terminal device by the first terminal device; and performing, by the second terminal device, a data exchange with the base station and/or at least one further terminal device using only communication resources included in the one or more resource subblocks assigned to the second terminal device by the first terminal device, communication resources of the resource block that are not included in the one or more resource slots assigned to the second terminal device not being independently selectable by the second terminal device.

19. The method according to claim 18, further comprising:

updating the second information to obtain updated second information; and transmitting the updated second information to the first terminal device and/or a group lead of a group of sidelink transmission-based, group-managed, terminal devices capable of exchanging data with each other using sidelink transmissions.

20. The method according to claim 19, further comprising:

after receiving the second information or after transmitting the updated second information entering, by the second terminal device, a) an inactive mode and/or b) an idle mode.

21. The method according to claim 18, further comprising:

transmitting data relating to a safety associated with a group of terminal devices, via at least one sidelink transmission, to at last one further terminal device; and/or transmitting data relating to a safety related to the network, via at least one sidelink transmission, to at least one further terminal device for a transmission to the base station by the at least one further terminal device.

22. An apparatus configured to operate in a network via which a plurality of terminal devices communicate, the apparatus comprising:

a first one of the plurality of terminal devices, which includes a wireless interface and a processor, wherein;

the processor is configured to:

receive, via the wireless interface and from a base station of the network, first information identifying a grant of a resource block usable for data exchanges on the network, the resource block defining a bounded set of communication resources in at least one of a time domain or a frequency domain that is granted to the first terminal device for division and assignment;

divide, based on the first information, the resource block into a plurality of resource slots; and configure, by the first terminal device, respective ones of the at least one further terminal device with respective ones of the resource subblocks;

the configuring includes:

assigning the respective ones of the resource subblocks to the respective ones of the at least one further terminal device; and providing, via the wireless interface and at least one sidelink, respective second information to the respective ones of the at least one further terminal device; and the processor is further configured such that respective second information is determined by the processor based on the first information and identifies, for each of the respective ones of the at least one further terminal device, a respective one of the resource subblocks that:

(i) is a strict subset of the bounded set of communication resources defined by the resource block, the strict subset resulting from the division of the resource block performed by the processor; and (ii) is assigned as an allocated portion to the respective further terminal device such that, from the bounded set of communication resources of the resource block, the respective further terminal device is authorized to perform data exchanges using only communication resources included in one or more of the resource subblocks assigned to the respective further terminal device by the first terminal device, communication resources of the resource block that are not included in the one or more of the resource subblocks assigned to the respective further terminal device not being independently selectable by the respective further terminal device.

23. A computer-implemented method for a network via which a first terminal device and at least one further terminal device can communicate, comprising the following steps:

determining, by a base station of the network, a grant of a resource block usable for data exchanges on the network, the resource block defining a bounded set of communication resources in at least one of a time domain or a frequency domain; and transmitting, by the base station, first information identifying the grant to at least the first terminal device, wherein:

the first terminal device is configured to, based on the first information, divide the resource block into a plurality of resource subblocks and assign respective ones of the resource subblocks to respective ones of the at least one further terminal device, including transmitting respective second information to each of one or more of the at least one further terminal device via at least one sidelink; and the first terminal device is configured such that the respective second information is determined by the first terminal device based on the first information and identifies, for each of the one or more of the at least one further terminal device, one or more resource subblocks that are strict subsets of the bounded set of communication resources defined by the resource block and that are assigned as allocated portions to the respective further terminal device.

24. The method according to claim 23, wherein the resource block is one of a plurality of resource blocks, the method further comprising:

assigning respective ones of the resource blocks to respective groups of the terminal devices.

25. An apparatus configured to operate in a network via which a first terminal device and at least one further terminal device can communicate, the apparatus comprising:

a base station, which includes a processor and a wireless interface, wherein;

the processor is configured to:

determine a grant of a resource block usable for data exchanges on the network, the resource block defining a bounded set of communication resources in at least one of a time domain or a frequency domain; and transmit, via the wireless interface, first information identifying the grant to at least the first terminal device;

the first terminal device is configured to, based on the first information, divide the resource block into a plurality of resource subblocks and assign respective ones of the resource subblocks to respective ones of the at least one further terminal device, including transmitting respective second information to each of one or more of the at least one further terminal device via at least one sidelink; and the first terminal device is configured such that the respective second information is determined by the first terminal device based on the first information and identifies, for each of the one or more of the at least one further terminal device, one or more resource subblocks that are strict subsets of the bounded set of communication resources defined by the resource block and that are assigned as allocated portions to the respective further terminal device.

26. A communication system of a network, comprising:

a base station; and a first terminal device;

wherein:

the first terminal device and at least one further terminal device can communicate with one another via the network;

each of the base station and the first terminal device includes a respective wireless interface and processor;

the processor of the base station is configured to:

determine a grant of a resource block usable for data exchanges on the network, the resource block defining a bounded set of communication resources in at least one of a time domain or a frequency domain; and transmit, via the wireless interface of the base station, first information identifying the grant to the first terminal device;

the processor of the first terminal device is configured to:

receive, via the wireless interface of the first terminal device, the first information;

divide, based on the first information, the resource block into a plurality of resource subblocks;

assign respective ones of the resource subblocks to respective ones of the at least one further terminal device; and provide, via the wireless interface of the first terminal device and at least one sidelink, respective second information to the respective ones of the at least one further terminal device;

the respective second information is determined by the processor of the first terminal device based on the first information and identifies, for each of the respective ones of the at least one further terminal device, a respective one of the resource subblocks that:

(i) is a strict subset of the bounded set of communication resources defined by the resource block, the strict subset resulting from a division of the resource block performed by the first terminal device; and (ii) is assigned as allocated portions to the respective further terminal device such that, from the bounded set of communication resources of the resource block, the respective further terminal device is authorized to perform data exchanges using only communication resources included in the one or more of the resource subblocks assigned to the respective further terminal device by the first terminal device.

27. A non-transitory computer-readable storage medium on which is stored instructions that are executable by a computer and that, when executed by the computer, cause the computer to perform a method for a network via which a first terminal device and at least one further terminal device communicate, the computer being part of the first terminal device and the method comprising the following steps:

receiving, by the first terminal device and from a base station of the network, first information identifying a grant of a resource block usable for data exchanges on the network, the resource block defining a bounded set of communication resources in at least one of a time domain or a frequency domain that is granted to the first terminal device for division and assignment;

dividing, by the first terminal device and based on the first information, the resource block into a plurality of resource subblocks; and configuring, by the first terminal device, respective ones of the at least one further terminal device with respective ones of the resource subblocks, wherein:

the configuring includes:

assigning the respective ones of the resource subblocks to the respective ones of the at least one further terminal device; and providing, via at least one sidelink, respective second information to the respective ones of the at least one further terminal device;

the respective second information is determined by the first terminal device based on the first information; and for each of the respective ones of the at least one further terminal device, the respective second information identifies a respective one of the resource subblocks that:

(i) is a strict subset of the bounded set of communication resources defined by the resource block, the strict subset resulting from the division of the resource block performed by the first terminal device; and (ii) is assigned as an allocated portion to the respective further terminal device such that, from the bounded set of communication resources of the resource block, the respective further terminal device is authorized to perform data exchanges using only communication resources included in one or more of the resource subblocks assigned to the respective further terminal device by the first terminal device.

* * * * *